United States Patent
Shi et al.

(10) Patent No.: US 10,973,029 B2
(45) Date of Patent: Apr. 6, 2021

(54) METHOD, DEVICE AND TERMINAL FOR PERFORMING FEEDBACK USING AN UPLINK REQUEST RESOURCE

(71) Applicant: HUAWEI TECHNOLOGIES CO., LTD., Guangdong (CN)

(72) Inventors: Jie Shi, Shenzhen (CN); Xingwei Zhang, Beijing (CN); Zhe Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/502,983

(22) Filed: Jul. 3, 2019

(65) Prior Publication Data

US 2019/0327743 A1 Oct. 24, 2019

Related U.S. Application Data

(63) Continuation of application No. PCT/CN2017/070310, filed on Jan. 5, 2017.

(51) Int. Cl.
*H04W 72/04* (2009.01)
*H04L 1/00* (2006.01)
(Continued)

(52) U.S. Cl.
CPC ....... *H04W 72/0453* (2013.01); *H04L 1/0031* (2013.01); *H04L 1/0044* (2013.01);
(Continued)

(58) Field of Classification Search
CPC ... H04L 1/0031; H04L 1/1854; H04L 1/0055; H04L 1/0091; H04L 1/0044; H04W 72/04; H04W 72/042; H04W 88/02
See application file for complete search history.

(56) References Cited

U.S. PATENT DOCUMENTS

2013/0010742 A1* 1/2013 Han ................ H04W 72/0413
370/329
2013/0039307 A1* 2/2013 Han ................ H04W 72/0406
370/329
(Continued)

FOREIGN PATENT DOCUMENTS

CN 106102169 A 11/2016
CN 106105084 A 11/2016
(Continued)

OTHER PUBLICATIONS

Extended European Search Report issued in European Application No. 17889963.9 dated Dec. 3, 2019, 10 pages.
(Continued)

*Primary Examiner* — Mewale A Ambaye
(74) *Attorney, Agent, or Firm* — Fish & Richardson P.C.

(57) ABSTRACT

Example uplink control information sending methods, network devices, and terminals are described. In one example method, a terminal determines physical uplink control channel PUCCH channel resource configuration information. The PUCCH channel resource configuration information is used to instruct the terminal to send uplink control information based on a configured PUCCH channel resource, and the PUCCH channel resource configuration information is preconfigured, or is sent by a network device. The terminal sends the uplink control information based on the PUCCH channel resource configuration information using the configured PUCCH channel resource. The uplink control information includes one or a combination of downlink data acknowledgement information, a downlink channel state information, a scheduling request, and buffer state information.

18 Claims, 10 Drawing Sheets

(51) Int. Cl.
*H04L 1/18* (2006.01)
*H04W 88/02* (2009.01)

(52) U.S. Cl.
CPC .......... *H04L 1/0055* (2013.01); *H04L 1/0091* (2013.01); *H04L 1/1854* (2013.01); *H04W 72/042* (2013.01); *H04W 88/02* (2013.01)

(56) References Cited

U.S. PATENT DOCUMENTS

| 2013/0272258 | A1* | 10/2013 | Lee | H04W 72/0413 |
| | | | | 370/329 |
| 2015/0264678 | A1 | 9/2015 | Yin et al. | |
| 2016/0234713 | A1 | 8/2016 | Lin et al. | |
| 2016/0270064 | A1* | 9/2016 | Dinan | H04L 5/001 |
| 2016/0338034 | A1* | 11/2016 | Aiba | H04L 1/1671 |
| 2016/0374071 | A1* | 12/2016 | Lee | H04W 72/0413 |
| 2017/0180098 | A1 | 6/2017 | You et al. | |
| 2018/0020430 | A1* | 1/2018 | Aiba | H04L 5/0057 |

FOREIGN PATENT DOCUMENTS

| WO | 2015058379 A1 | 4/2015 |
| WO | 2015133778 A1 | 9/2015 |

OTHER PUBLICATIONS

R1-1609538—Intel Corporation, "Resource allocation for NR uplink control channel," 3GPP Draft; 3GPP TSG-RAN WG1 #86bis, Lisbon, Portugal, Oct. 10-14, 2016, XP051149577, 5 pages.
PCT International Search Report and Written Opinion issued in International Application No. PCT/CN2017/070310 dated Oct. 11, 2017, 17 pages.

* cited by examiner

PRIOR ART

PRIOR ART

FIG. 3

METHOD, DEVICE AND TERMINAL FOR PERFORMING FEEDBACK USING AN UPLINK REQUEST RESOURCE

CROSS-REFERENCE TO RELATED APPLICATIONS

This application is a continuation of International Application No. PCT/CN2017/070310, filed on Jan. 5, 2017, the disclosure of which is hereby incorporated by reference in its entirety.

TECHNICAL FIELD

This application relates to the field of communications technologies, and in particular, to an uplink control information sending method, a network device, and a terminal.

BACKGROUND

In a communications network, a signal is transmitted in a unit of a radio frame (radio frame), and each radio frame includes a subframe (subframe).

For example, in a LTE) frequency division duplex (FDD) system, a frame structure (frame format) shown in FIG. 1 may be used. In FIG. 1, on each carrier, one radio frame includes ten 1 ms subframes, each subframe includes two 0.5 ms slots (slot), and each slot includes a fixed quantity of orthogonal frequency division multiplexing (OFDM) symbols. In the LTE FDD system, during uplink transmission and downlink transmission, different carrier frequencies are used, but a same frame format is used, a same subcarrier spacing is supported, and subframes with a same length and slots with a same length are used for working.

For another example, in an LTE time division duplex (TDD) system, a frame structure shown in FIG. 2 may be used. In FIG. 2, each 10 ms radio frame includes two 5 ms half-frames, and each half-frame includes five subframes each with a length of 1 ms. Subframes in Frame structure type 2 (FS2) include downlink subframes, uplink subframes, and special subframes. Each special subframe includes three parts: a downlink pilot timeslot (DwPTS), a guard period (Guard Period, GP), and an uplink pilot timeslot (UpPTS). Each half-frame includes at least one downlink subframe, at least one uplink subframe, and a maximum of one special subframe. In the LTE TDD system, during uplink transmission and downlink transmission, different subframes or slots at a same frequency are used, a same subcarrier spacing is supported, each slot length is 0.5 ms, and each subframe length is 1 ms.

To meet requirements of more future service types, in a new radio (NR) communications technology (the NR is a next-generation radio access network technology that can be applied to a future evolved network, for example, a 5G communications system), various subcarrier spacings, transmission time intervals with different lengths, slots with different lengths, mini-slots with different lengths, and two multiplexing manners: TDD and FDD are supported during uplink transmission and downlink transmission. For example, FIG. 3 shows a subcarrier spacing that may be used in the NR communications technology. In FIG. 3, there are four types of subcarrier spacings, each type of subcarrier spacing is $2^m \times 15$ KHz, and each resource block (RB) includes 12 subcarriers or an agreed quantity of subcarriers. FIG. 4 is a schematic diagram of different subframes, slots, and mini-slots corresponding to different subcarrier spacings in an FDD communications system in the NR communications technology. The mini-slot is a combination of several OFDM symbols. FIG. 5 is a schematic diagram of frame structures corresponding to different subcarrier spacings during uplink transmission and downlink transmission in a TDD communications system in the NR communications technology.

An NR communications system uses data sending and uplink control information feedback mechanisms similar to those of LTE, for example, a response mechanism. A network device sends downlink data to a terminal using a specified frame format during downlink transmission, and the terminal needs to feed back acknowledgement information of the downlink data using a frame format corresponding to the specified frame format during uplink transmission. The acknowledgement information is a positive acknowledgement (ACK) or a negative acknowledgement (NACK). The acknowledgement information may be sent using a physical uplink control channel (PUCCH) resource.

However, currently, when uplink control information, especially the acknowledgement information, is sent using the PUCCH channel resource, frequently, the uplink control information is not fed back in time.

SUMMARY

Embodiments of this application provide an uplink control information sending method, a network device, and a terminal, to increase a speed of feeding back uplink control information corresponding to downlink data and a speed of performing feedback using an uplink request resource.

According to a first aspect, an uplink control information sending method is provided. In the method, a terminal sends, based on PUCCH channel resource configuration information used to instruct the terminal to send uplink control information based on a configured PUCCH channel resource, the uplink control information using the configured PUCCH channel resource. The uplink control information includes one or a combination of downlink data acknowledgement information, a downlink channel state information, a scheduling request, and buffer state information. The PUCCH channel resource configuration information is used to instruct the terminal to send the uplink control information based on the configured PUCCH channel resource. Therefore, PUCCH channel resources of different frame structures can be fully used, and uplink control information fed back using a PUCCH channel resource of a frame structure with a relatively large feedback amount is fed back using a PUCCH channel resource of a frame structure with a relatively small feedback amount, so that uplink control information can be quickly fed back using PUCCH channel resources of various frame structures.

In a possible design, the PUCCH channel resource configuration information is sent by a network device. The network device determines the PUCCH channel resource configuration information used to instruct the terminal to send the uplink control information based on the configured PUCCH channel resource, and sends the determined PUCCH channel resource configuration information to the terminal. The terminal obtains the PUCCH channel resource configuration information sent by the network device, and sends the uplink control information based on the PUCCH channel resource configuration information using the configured PUCCH channel resource.

In another possible design, the PUCCH channel resource configuration information is preconfigured, and the terminal may obtain the preconfigured PUCCH channel resource configuration information, and send the uplink control information based on the PUCCH channel resource configuration information using the configured PUCCH channel resource.

The PUCCH channel resource configuration information includes at least one of frequency band information, carrier information, cell identifier information, cell synchronization information, beam information, frame format information, subcarrier spacing information, a channel resource location, time domain and/or frequency domain location information of an orthogonal frequency division multiplexing OFDM symbol occupied by a PUCCH, sequence information used by a PUCCH, resource index information used by a PUCCH, sequence cyclic offset information used for the uplink control information, orthogonal sequence information used for the uplink control information, sequence cyclic offset information used for a reference signal, and an orthogonal sequence used for a reference signal.

The PUCCH channel resource configuration information includes at least one of the following combinations:

a combination of the frequency band information, the carrier information, the cell identifier information, and the cell synchronization information; a combination of the frequency band information, the carrier information, the cell identifier information, the cell synchronization information, and the beam information; a combination of the subcarrier spacing information and the channel resource location; and a combination of the subcarrier spacing information and the time domain and/or frequency domain location information of the OFDM symbol occupied by the PUCCH.

In a possible design, the PUCCH channel resource configuration information may be further used to instruct to: update, to a second PUCCH channel resource, a first PUCCH channel resource used to feed back the uplink control information, where a subcarrier spacing of the second PUCCH channel resource is different from a subcarrier spacing of the first PUCCH channel resource, or a subcarrier on which the second PUCCH channel resource is located is different from a subcarrier on which the first PUCCH channel resource is located; or feed back, on the configured PUCCH channel resource, a channel state information and/or feedback information of downlink data that are/is received on a PDSCH channel resource, where a subcarrier spacing of the configured PUCCH channel resource is different from a subcarrier spacing of the PDSCH channel resource, or a subcarrier on which the configured PUCCH channel resource is located is different from a subcarrier on which the PDSCH channel resource is located, to reduce a feedback delay.

The subcarrier spacing of the second PUCCH channel resource is greater than and/or equal to the subcarrier spacing of the first PUCCH channel resource; and the subcarrier spacing of the configured PUCCH channel resource is greater than and/or equal to the subcarrier spacing of the PDSCH channel resource, to further reduce the feedback delay.

In still another possible design, the PUCCH channel resource configuration information is used to instruct to update, to the second PUCCH channel resource, the first PUCCH channel resource used to feed back the uplink control information. A time of feeding back the uplink control information using the second PUCCH channel resource is earlier than or equal to a time of feeding back the uplink control information using the first PUCCH channel resource; or a time of feeding back the uplink control information using the second PUCCH channel resource is within a feedback time range agreed on by the terminal. If the first PUCCH channel resource works in a TDD manner, the second PUCCH channel resource also works in the TDD manner, thereby improving resource utilization.

In still another possible design, the downlink data acknowledgement information fed back using the configured PUCCH channel resource is downlink data acknowledgement information fed back using at least two types of first PUCCH channel resources or downlink data acknowledgement information fed back using at least two types of physical downlink shared channel PDSCH channel resources. If the first PUCCH channel resource used to feed back the downlink data acknowledgement information works in the TDD manner, the second PUCCH channel resource also works in the TDD manner, thereby increasing a feedback speed.

The terminal may feed back, using the second PUCCH channel resource, downlink data acknowledgement information fed back using at least one of the at least two types of first PUCCH channel resources; or may feed back, using the configured PUCCH channel resource, downlink data acknowledgement information fed back using at least one of the at least two types of PDSCH channel resources, to avoid a conflict when a plurality of types of downlink data acknowledgement information are fed back using the second PUCCH channel resource or the configured PUCCH channel resource.

The at least one of the at least two types of first PUCCH channel resources is selected based on a sequence of priorities of the at least two types of first PUCCH channel resources. Alternatively, the terminal feeds back, through binding or multiplexing using the second PUCCH channel resource, the downlink data acknowledgement information fed back using the at least one of the at least two types of first PUCCH channel resources.

The at least one of the at least two types of PDSCH channel resources is selected based on a sequence of priorities of the at least two types of PDSCH channel resources. Alternatively, the terminal feeds back, through binding or multiplexing using the configured PUCCH channel resource, the downlink data acknowledgement information fed back using the at least one of the at least two types of PDSCH channel resources.

The sequence of priorities is determined according to at least one of a hybrid automatic repeat request identifier priority that is preset by the network device, a frame format priority, and a delay requirement urgency degree.

In still another possible design, the network device sends indication information after sending the PUCCH channel resource configuration information, where the indication information is used to instruct the terminal to send the uplink control information using a PUCCH channel resource that is not configured. The indication information is sent using downlink control information. After the terminal feeds back the uplink control information using the configured PUCCH channel resource, the method further includes: receiving, by the terminal, the indication information sent by the network device, where the indication information is used to instruct the terminal to send the uplink control information using the PUCCH channel resource that is not configured; and sending, by the terminal, the uplink control information according to the indication information using the PUCCH channel resource that is not configured, to be applicable to a scenario in which load corresponding to downlink data acknowledgement information fed back using PUCCH channel resources of various frame structures tends to be balanced.

The indication information may be sent using the downlink control information, or may be sent using at least one or a combination of broadcast information, a system message, RRC dedicated signaling, a MAC CE, and physical layer control information. Optionally, a combination of a plurality of pieces of indication information is sent using one or a combination of the broadcast information, the system message, the RRC dedicated signaling, and the MAC CE, and one of the plurality of pieces of indication information is activated using the physical layer control information.

In still another possible design, the network device sends effective information of feeding back the uplink control information by the terminal using the configured PUCCH channel resource. After determining that the effective information of feeding back the uplink control information using the configured PUCCH channel resource is satisfied, the terminal may stop feeding back the uplink control information using the configured PUCCH channel resource, and instead, the terminal sends the uplink control information using another channel resource. For example, the terminal performs a rollback to feed back the uplink control information using a PUCCH channel resource that is not configured. The effective information may be an effective time, a timer, or a quantity of times of feeding back the downlink data acknowledgement information using the configured PUCCH channel resource.

In still another possible design, the uplink control information includes the downlink data acknowledgement information, and the downlink data acknowledgement information includes at least one of the following:
specified downlink data acknowledgement information fed back using a first PUCCH channel resource; downlink data acknowledgement information, in a specified HARQ process, fed back using a first PUCCH channel resource; specified downlink data acknowledgement information, in a specified HARQ process, fed back using a first PUCCH channel resource; acknowledgement information, of a specified code block of specified downlink data in a specified HARQ process, fed back using a first PUCCH channel resource; transport block acknowledgement information sent using a PDSCH channel resource; transport block acknowledgement information, in a specified HARQ process, sent using a PDSCH channel resource; specified transport block acknowledgement information, in a specified HARQ process, sent using a PDSCH channel resource; acknowledgement information, of a specified code block of a transport block in a specified HARQ process, sent using a PDSCH channel resource; and acknowledgement information, of a code block of a transport block, sent using a PDSCH channel resource.

In still another possible design, the network device sends the PUCCH channel resource configuration information using at least one or a combination of broadcast information, system information, an RRC message, a MAC CE, and physical layer signaling, and the terminal receives the PUCCH channel resource configuration information using at least one or a combination of the RRC message, the MAC CE, and the physical layer signaling.

A set of a plurality of pieces of corresponding PUCCH channel resource configuration information may be sent using one or a combination of the broadcast information, the system message, the RRC dedicated signaling, and the MAC CE, and one of the plurality of pieces of PUCCH channel resource configuration information is activated using the physical layer control information. The activated PUCCH channel resource configuration information may be sent in one or a combination of the following manners: implicitly sending the PUCCH channel resource configuration information using DCI of a downlink channel or a resource on which the downlink channel is located; or implicitly sending the PUCCH channel resource configuration information using a resource on which a PDCCH is located or DCI that is used to indicate a PDCCH channel resource publicly used by UE; or implicitly sending the PUCCH channel resource configuration information using a resource on which a PDCCH is located or DCI that is used to indicate a reference channel resource used by the terminal; or implicitly sending the PUCCH channel resource configuration information using a resource on which a PDCCH is located or DCI that is used to indicate a specific channel resource used by the terminal. The implicitly sending the PUCCH channel resource configuration information using DCI of a downlink channel or a resource on which the downlink channel is located includes implicitly sending the PUCCH channel resource configuration information using a resource on which a corresponding downlink channel is located or DCI of the downlink channel used to indicate a PUCCH channel resource that is not configured.

If the terminal receives the PUCCH channel resource configuration information using the physical layer signaling, the PUCCH channel resource configuration information is implicitly received using the DCI or the resource on which the downlink channel is located, or the PUCCH channel resource configuration information is implicitly received using the resource on which the PDCCH is located or the DCI that is used to indicate the PDCCH channel resource publicly used by the terminal, or the PUCCH channel resource configuration information is implicitly received using the resource on which the PDCCH is located or the DCI that is used to indicate the reference channel resource used by the terminal, or the PUCCH channel resource configuration information is implicitly received using the resource on which the PDCCH is located or the DCI that is used to indicate the specific channel resource used by the terminal.

A bit in the DCI is used to indicate at least one of PUCCH channel frame format information, PUCCH resource index information, PUCCH channel identifier information, and PUCCH resource location information.

If the network device sends the PUCCH channel resource configuration information using the RRC message, and the PUCCH channel resource configuration information includes at least two types of configured PUCCH channel resources, the network device sends activation indication information after sending the PUCCH channel resource configuration information, where the activation indication information is used to activate one of the at least two types of configured PUCCH channel resources. The terminal receives the PUCCH channel resource configuration information using the RRC message. The PUCCH channel resource configuration information includes the at least two types of configured PUCCH channel resources. Before feeding back the uplink control information using the configured PUCCH channel resource, the terminal receives the activation indication information sent by the network device, determines the configured PUCCH channel resource according to the activation indication information, and feeds back the uplink control information using one of the at least two types of configured PUCCH channel resources.

In still another possible design, the PUCCH channel resource configuration information is PUCCH channel resource update information. The PUCCH channel resource configuration information is used to instruct the terminal to feed back the downlink data acknowledgement information using an updated PUCCH channel resource, and the updated PUCCH channel resource is updated based on the PUCCH channel resource update information. The terminal feeds back the downlink data acknowledgement information using the updated PUCCH channel resource, and the updated PUCCH channel resource is updated based on the PUCCH channel resource update information.

According to a second aspect, a terminal is provided, and the terminal has functions of implementing behavior of the terminal in the first aspect. The functions may be implemented by hardware, or may be implemented by hardware by executing corresponding software. The hardware or software includes one or more modules corresponding to the foregoing functions.

In a possible design, the terminal includes a receiving unit, a processing unit, and a sending unit. The processing unit is configured to determine PUCCH channel resource configuration information, where the PUCCH channel resource configuration information is used to instruct the terminal to send uplink control information based on a configured PUCCH channel resource, and the PUCCH channel resource configuration information is preconfigured, or is sent by a network device and received using the receiving unit. The sending unit is configured to send, based on the PUCCH channel resource configuration information determined by the processing unit, the uplink control information using the configured PUCCH channel resource. The uplink control information includes one or a combination of downlink data acknowledgement information, a downlink channel state information, a scheduling request, and buffer state information.

The downlink data acknowledgement information includes at least one of the following: specified downlink data acknowledgement information fed back using a first PUCCH channel resource; downlink data acknowledgement information, in a specified HARQ process, fed back using a first PUCCH channel resource; specified downlink data acknowledgement information, in a specified HARQ process, fed back using a first PUCCH channel resource; acknowledgement information, of a specified code block of specified downlink data in a specified HARQ process, fed back using a first PUCCH channel resource; transport block acknowledgement information sent using a PDSCH channel resource; transport block acknowledgement information, in a specified HARQ process, sent using a PDSCH channel resource; specified transport block acknowledgement information, in a specified HARQ process, sent using a PDSCH channel resource; acknowledgement information, of a specified code block of a transport block in a specified HARQ process, sent using a PDSCH channel resource; and acknowledgement information, of a code block of a transport block, sent using a PDSCH channel resource.

The PUCCH channel resource configuration information includes at least one of frequency band information, carrier information, cell identifier information, cell synchronization information, beam information, frame format information, subcarrier spacing information, a channel resource location, time domain and/or frequency domain location information of an orthogonal frequency division multiplexing OFDM symbol occupied by a PUCCH, sequence information used by a PUCCH, resource index information used by a PUCCH, sequence cyclic offset information used for the uplink control information, orthogonal sequence information used for the uplink control information, sequence cyclic offset information used for a reference signal, and an orthogonal sequence used for a reference signal.

The PUCCH channel resource configuration information includes at least one of the following combinations: a combination of the frequency band information, the carrier information, the cell identifier information, and the cell synchronization information; a combination of the frequency band information, the carrier information, the cell identifier information, the cell synchronization information, and the beam information; a combination of the subcarrier spacing information and the channel resource location; and a combination of the subcarrier spacing information and the time domain and/or frequency domain location information of the OFDM symbol occupied by the PUCCH.

In a possible design, the PUCCH channel resource configuration information is used to instruct to: update, to a second PUCCH channel resource, a first PUCCH channel resource used to feed back the uplink control information, where a subcarrier spacing of the second PUCCH channel resource is different from a subcarrier spacing of the first PUCCH channel resource, or a subcarrier on which the second PUCCH channel resource is located is different from a subcarrier on which the first PUCCH channel resource is located; or feed back, on the configured PUCCH channel resource, a channel state information and/or feedback information of downlink data that are/is received on a PDSCH channel resource, where a subcarrier spacing of the configured PUCCH channel resource is different from a subcarrier spacing of the PDSCH channel resource, or a subcarrier on which the configured PUCCH channel resource is located is different from a subcarrier on which the PDSCH channel resource is located.

In still another possible design, the subcarrier spacing of the second PUCCH channel resource is greater than and/or equal to the subcarrier spacing of the first PUCCH channel resource; and the subcarrier spacing of the configured PUCCH channel resource is greater than and/or equal to the subcarrier spacing of the PDSCH channel resource.

In still another possible design, the PUCCH channel resource configuration information is used to instruct to update, to the second PUCCH channel resource, the first PUCCH channel resource used to feed back the uplink control information. A time of feeding back the uplink control information using the second PUCCH channel resource is earlier than or equal to a time of feeding back the uplink control information using the first PUCCH channel resource; or a time of feeding back the uplink control information using the second PUCCH channel resource is within a feedback time range agreed on by the terminal.

In still another possible design, the uplink control information includes the downlink data acknowledgement information; and the downlink data acknowledgement information fed back using the configured PUCCH channel resource is downlink data acknowledgement information fed back using at least two types of first PUCCH channel resources or downlink data acknowledgement information fed back using at least two types of PDSCH channel resources.

In still another possible design, the sending unit feeds back the downlink data acknowledgement information in the following manners using the configured PUCCH channel resource: feeding back, using the second PUCCH channel resource, downlink data acknowledgement information fed back using at least one of the at least two types of first PUCCH channel resources; or feeding back, using the configured PUCCH channel resource, downlink data acknowledgement information fed back using at least one of the at least two types of PDSCH channel resources.

The at least one of the at least two types of first PUCCH channel resources is selected based on a sequence of priorities of the at least two types of first PUCCH channel resources. The at least one of the at least two types of PDSCH channel resources is selected based on a sequence of priorities of the at least two types of PDSCH channel resources. The sequence of priorities is determined according to at least one of a hybrid automatic repeat request identifier priority that is preset by the network device, a frame format priority, and a delay requirement urgency degree.

In still another possible design, the sending unit feeds back, through binding or multiplexing using the second PUCCH channel resource, the downlink data acknowledgement information fed back using the at least one of the at least two types of first PUCCH channel resources. The sending unit feeds back, through binding or multiplexing using the configured PUCCH channel resource, the downlink data acknowledgement information fed back using the at least one of the at least two types of PDSCH channel resources.

In still another possible design, the receiving unit is further configured to: after the sending unit feeds back the uplink control information using the configured PUCCH channel resource, receive indication information sent by the network device, where the indication information is used to instruct the terminal to send the uplink control information using a PUCCH channel resource that is not configured. The sending unit is further configured to send the uplink control information according to the indication information using the PUCCH channel resource that is not configured.

The receiving unit receives the indication information using downlink control information.

In still another possible design, the processing unit is further configured to determine effective information of feeding back the uplink control information using the configured PUCCH channel resource.

In still another possible design, the receiving unit receives the PUCCH channel resource configuration information using at least one or a combination of an RRC message, a MAC CE, and physical layer signaling.

If the PUCCH channel resource configuration information is received using the physical layer signaling, the PUCCH channel resource configuration information is implicitly received using downlink control information DCI or a resource on which a downlink channel is located, or the PUCCH channel resource configuration information is implicitly received using a resource on which a PDCCH is located or DCI that is used to indicate a PDCCH channel resource publicly used by the terminal, or the PUCCH channel resource configuration information is implicitly received using a resource on which a PDCCH is located or DCI that is used to indicate a reference channel resource used by the terminal, or the PUCCH channel resource configuration information is implicitly received using a resource on which a PDCCH is located or DCI that is used to indicate a specific channel resource used by the terminal.

A bit in the DCI is used to indicate at least one of PUCCH channel frame format information, PUCCH resource index information, PUCCH channel identifier information, and PUCCH resource location information.

If the PUCCH channel resource configuration information is received using the RRC message, the PUCCH channel resource configuration information includes at least two types of configured PUCCH channel resources. The receiving unit is further configured to: before the sending unit feeds back the uplink control information using the configured PUCCH channel resource, receive activation indication information sent by the network device, where the activation indication information is used to activate one of the at least two types of configured PUCCH channel resources.

In still another possible design, the PUCCH channel resource configuration information is PUCCH channel resource update information. The sending unit feeds back the downlink data acknowledgement information using an updated PUCCH channel resource, and the updated PUCCH channel resource is updated based on the PUCCH channel resource update information.

According to a third aspect, a network device is provided, and the network device has functions of implementing behavior of the network device in the first aspect. The functions may be implemented by hardware, or may be implemented by hardware by executing corresponding software. The hardware or software includes one or more modules corresponding to the foregoing functions.

In a possible design, the network device includes a processing unit and a sending unit. The processing unit is configured to determine PUCCH channel resource configuration information, where the PUCCH channel resource configuration information is used to instruct a terminal to send uplink control information based on a configured PUCCH channel resource. The sending unit is configured to send the PUCCH channel resource configuration information determined by the processing unit. The uplink control information includes one or a combination of downlink data acknowledgement information, a downlink channel state information, a scheduling request, and buffer state information.

The downlink data acknowledgement information includes at least one of the following: specified downlink data acknowledgement information fed back using a first PUCCH channel resource; downlink data acknowledgement information, in a specified HARQ process, fed back using a first PUCCH channel resource; specified downlink data acknowledgement information, in a specified HARQ process, fed back using a first PUCCH channel resource; acknowledgement information, of a specified code block of specified downlink data in a specified HARQ process, fed back using a first PUCCH channel resource; transport block acknowledgement information sent using a PDSCH channel resource; transport block acknowledgement information, in a specified HARQ process, sent using a PDSCH channel resource; specified transport block acknowledgement information, in a specified HARQ process, sent using a PDSCH channel resource; acknowledgement information, of a specified code block of a transport block in a specified HARQ process, sent using a PDSCH channel resource; and acknowledgement information, of a code block of a transport block, sent using a PDSCH channel resource.

The PUCCH channel resource configuration information includes at least one of frequency band information, carrier information, cell identifier information, cell synchronization information, beam information, frame format information, subcarrier spacing information, a channel resource location, time domain and/or frequency domain location information of an orthogonal frequency division multiplexing OFDM symbol occupied by a PUCCH, sequence information used by a PUCCH, resource index information used by a PUCCH, sequence cyclic offset information used for the uplink control information, orthogonal sequence information used for the uplink control information, sequence cyclic offset information used for a reference signal, and an orthogonal sequence used for a reference signal.

The PUCCH channel resource configuration information includes at least one of the following combinations: a combination of the frequency band information, the carrier information, the cell identifier information, and the cell synchronization information; a combination of the frequency band information, the carrier information, the cell identifier information, the cell synchronization information, and the beam information; a combination of the subcarrier spacing information and the channel resource location; and a combination of the subcarrier spacing information and the time domain and/or frequency domain location information of the OFDM symbol occupied by the PUCCH.

In a possible design, the PUCCH channel resource configuration information is used to instruct to: update, to a second PUCCH channel resource, a first PUCCH channel resource used to feed back the uplink control information, where a subcarrier spacing of the second PUCCH channel resource is different from a subcarrier spacing of the first PUCCH channel resource, or a subcarrier on which the second PUCCH channel resource is located is different from a subcarrier on which the first PUCCH channel resource is located; or feed back, on the configured PUCCH channel resource, a channel state information and/or feedback information of downlink data that are/is received on a PDSCH channel resource, where a subcarrier spacing of the configured PUCCH channel resource is different from a subcarrier spacing of the PDSCH channel resource, or a subcarrier on which the configured PUCCH channel resource is located is different from a subcarrier on which the PDSCH channel resource is located.

In still another possible design, the subcarrier spacing of the second PUCCH channel resource is greater than and/or equal to the subcarrier spacing of the first PUCCH channel resource; and the subcarrier spacing of the configured PUCCH channel resource is greater than and/or equal to the subcarrier spacing of the PDSCH channel resource.

In still another possible design, the PUCCH channel resource configuration information is used to instruct to update, to the second PUCCH channel resource, the first PUCCH channel resource used to feed back the uplink control information. A time of feeding back the uplink control information using the second PUCCH channel resource is earlier than or equal to a time of feeding back the uplink control information using the first PUCCH channel resource; or a time of feeding back the uplink control information using the second PUCCH channel resource is within a feedback time range agreed on by the terminal.

In still another possible design, the uplink control information includes the downlink data acknowledgement information; and the downlink data acknowledgement information fed back using the configured PUCCH channel resource is downlink data acknowledgement information fed back using at least two types of first PUCCH channel resources or downlink data acknowledgement information fed back using at least two types of physical downlink shared channel PDSCH channel resources.

In still another possible design, downlink data acknowledgement information fed back using the second PUCCH channel resource is downlink data acknowledgement information fed back using at least one of the at least two types of first PUCCH channel resources; or the downlink data acknowledgement information fed back using the configured PUCCH channel resource is downlink data acknowledgement information fed back using at least one of the at least two types of PDSCH channel resources.

In still another possible design, the at least one of the at least two types of first PUCCH channel resources is selected based on a sequence of priorities of the at least two types of first PUCCH channel resources. The at least one of the at least two types of PDSCH channel resources is selected based on a sequence of priorities of the at least two types of PDSCH channel resources. The sequence of priorities is determined according to at least one of a hybrid automatic repeat request identifier priority that is preset by the network device, a frame format priority, and a delay requirement urgency degree.

The PUCCH channel resource configuration information is used to instruct the terminal to feed back, through binding or multiplexing using the second PUCCH channel resource, the downlink data acknowledgement information fed back using the at least one of the at least two types of first PUCCH channel resources. Alternatively, the PUCCH channel resource configuration information is used to instruct the terminal to feed back, through binding or multiplexing using the configured PUCCH channel resource, the downlink data acknowledgement information fed back using the at least one of the at least two types of PDSCH channel resources.

In still another possible design, the sending unit is further configured to send indication information after sending the PUCCH channel resource configuration information, where the indication information is used to instruct the terminal to send the uplink control information using a PUCCH channel resource that is not configured.

The indication information is sent using downlink control information.

In still another possible design, the sending unit is further configured to send effective information of feeding back the uplink control information by the terminal using the configured PUCCH channel resource.

In still another possible design, the sending unit sends the PUCCH channel resource configuration information using at least one or a combination of an RRC message, a Media Access Control control element MAC CE, and physical layer signaling.

If the PUCCH channel resource configuration information is sent using the physical layer signaling, the PUCCH channel resource configuration information is implicitly sent using a resource on which a corresponding downlink channel is located or downlink control information DCI of the downlink channel used to indicate a PUCCH channel resource that is not configured, or the PUCCH channel resource configuration information is implicitly sent using a resource on which a PDCCH is located or DCI that is used to indicate a PDCCH channel resource publicly used by the terminal, or the PUCCH channel resource configuration information is implicitly sent using a resource on which a PDCCH is located or DCI that is used to indicate a reference channel resource used by the terminal, or the PUCCH channel resource configuration information is implicitly sent using a resource on which a PDCCH is located or DCI that is used to indicate a specific channel resource used by the terminal.

A bit in the DCI is used to indicate at least one of PUCCH channel frame format information, PUCCH resource index information, PUCCH channel identifier information, and PUCCH resource location information.

If the PUCCH channel resource configuration information is sent using the RRC message, and the PUCCH channel resource configuration information includes at least two types of configured PUCCH channel resources, the sending unit is further configured to send activation indication information after sending the PUCCH channel resource configuration information, where the activation indication information is used to activate one of the at least two types of configured PUCCH channel resources.

In still another possible design, the PUCCH channel resource configuration information is PUCCH channel resource update information. The PUCCH channel resource configuration information is used to instruct the terminal to feed back the downlink data acknowledgement information using an updated PUCCH channel resource, and the updated PUCCH channel resource is updated based on the PUCCH channel resource update information.

According to a fourth aspect, a terminal is provided, and the terminal includes a processor, a memory, a receiver, and a transmitter. The memory is configured to store an instruction, and the processor is configured to execute the instruction stored in the memory, to control the receiver and the transmitter to receive and send a signal. When the processor executes the instruction stored in the memory, the terminal is configured to complete any method related to the terminal described in the first aspect.

The terminal may further include an antenna.

According to a fifth aspect, a network device is provided, and the network device includes a processor, a memory, and a transceiver. The memory is configured to store an instruction, and the processor is configured to execute the instruction stored in the memory, to control the transceiver to receive and send a signal. When the processor executes the instruction stored in the memory, the network device is configured to complete any method related to the network device described in the first aspect.

According to a sixth aspect, a computer storage medium is provided, and the computer storage medium is configured to store some instructions. When the instructions are executed, any method related to the foregoing terminal or network device may be completed.

According to a seventh aspect, a communications system is provided, and the communications system includes a terminal and a network device. The network device is the network device in the fifth aspect, and the terminal is the terminal in the fourth aspect.

According to the uplink control information sending method, the terminal, and the network device provided in the embodiments of this application, the PUCCH channel resource configuration information is used to instruct the terminal to send the uplink control information based on the configured PUCCH channel resource. Therefore, PUCCH channel resources of different frame structures can be fully used, and uplink control information fed back using a PUCCH channel resource of a frame structure with a relatively large feedback amount is fed back using a PUCCH channel resource of a frame structure with a relatively small feedback amount, so that uplink control information can be quickly fed back using PUCCH channel resources of various frame structures.

DESCRIPTION OF DRAWINGS

Figure 3:
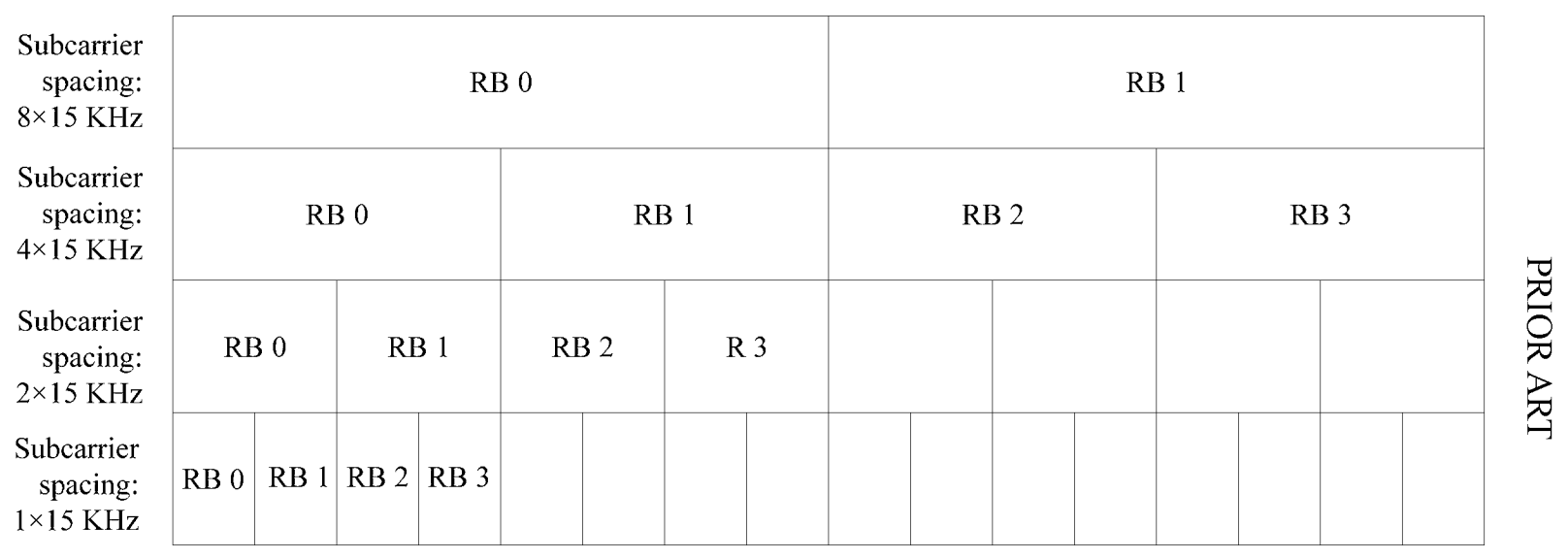

FIG. 3 is a schematic diagram of a subcarrier spacing that may be used in an NR communications technology;

DESCRIPTION OF EMBODIMENTS

The following describes the embodiments of this application with reference to the accompanying drawings.

First, some terms in this application are described for ease of understanding by a person skilled in the art.

(1). A network device may be referred to as a radio access network (RAN) device. The network device is a device that connects a terminal and a radio network, and includes but is not limited to an evolved NodeB (eNB), a radio network controller (RNC), a NodeB (NB), a base station controller (BSC), a base transceiver station (BTS), a home eNodeB (HeNB or HNB), a baseband unit (BBU), a Wireless Fidelity (Wi-Fi) access point (AP), a transmission point (TP) or a transmission and reception point (TRP), or the like.

(2). A terminal is a device that provides a user with voice and/or data connectivity, and may include various handheld devices having a wireless communication function, an in-vehicle device, a wearable device, a computing device, or another processing device connected to a wireless modem, user equipment (UE) in various forms, a mobile station (MS), terminal equipment, a transmission point (TP) or transmission and reception point (TRP), or the like.

(3). Interaction in this application refers to a process in which information is transferred between two interaction parties, and the information transferred herein may be the same or may be different. For example, when the two interaction parties are a base station 1 and a base station 2, the base station 1 may request information from the base station 2, and the base station 2 provides the base station 1 with the information requested by the base station 1. Certainly, the base station 1 and the base station 2 may request information from each other, and the information requested herein may be the same or may be different.

(4) "A plurality of" means two or more. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

(5) Nouns "network" and "system" are usually interchangeably used, but meanings of the nouns can be understood by a person skilled in the art. The terms "information", "signal", "message", and "channel" may be interchangeably used sometimes. It should be noted that expressed meanings are consistent when differences are not emphasized. The terms "of", "corresponding (corresponding or relevant)", and "corresponding" may be interchangeably used sometimes. It should be noted that expressed meanings are consistent when differences are not emphasized.

Figure 1:
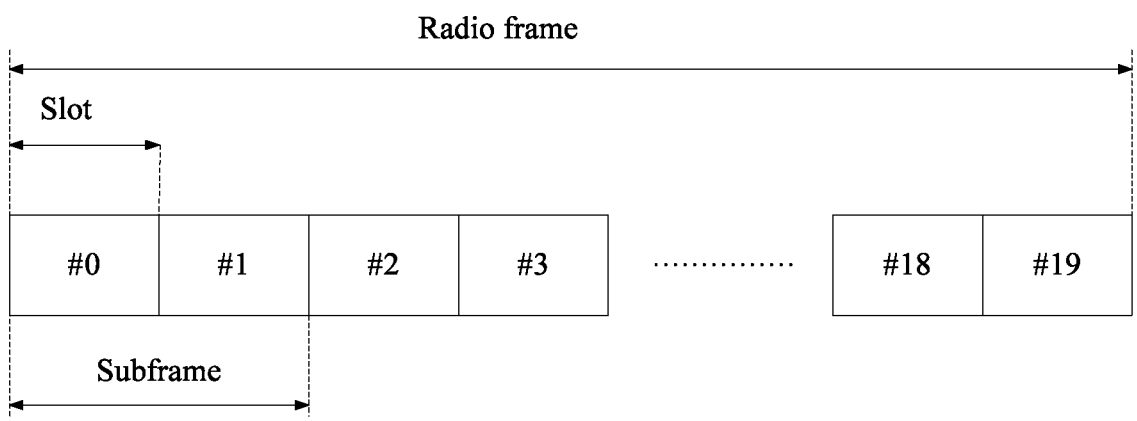
FIG. 1 is a schematic diagram of a frame structure in an FDD system.
Figure 2:
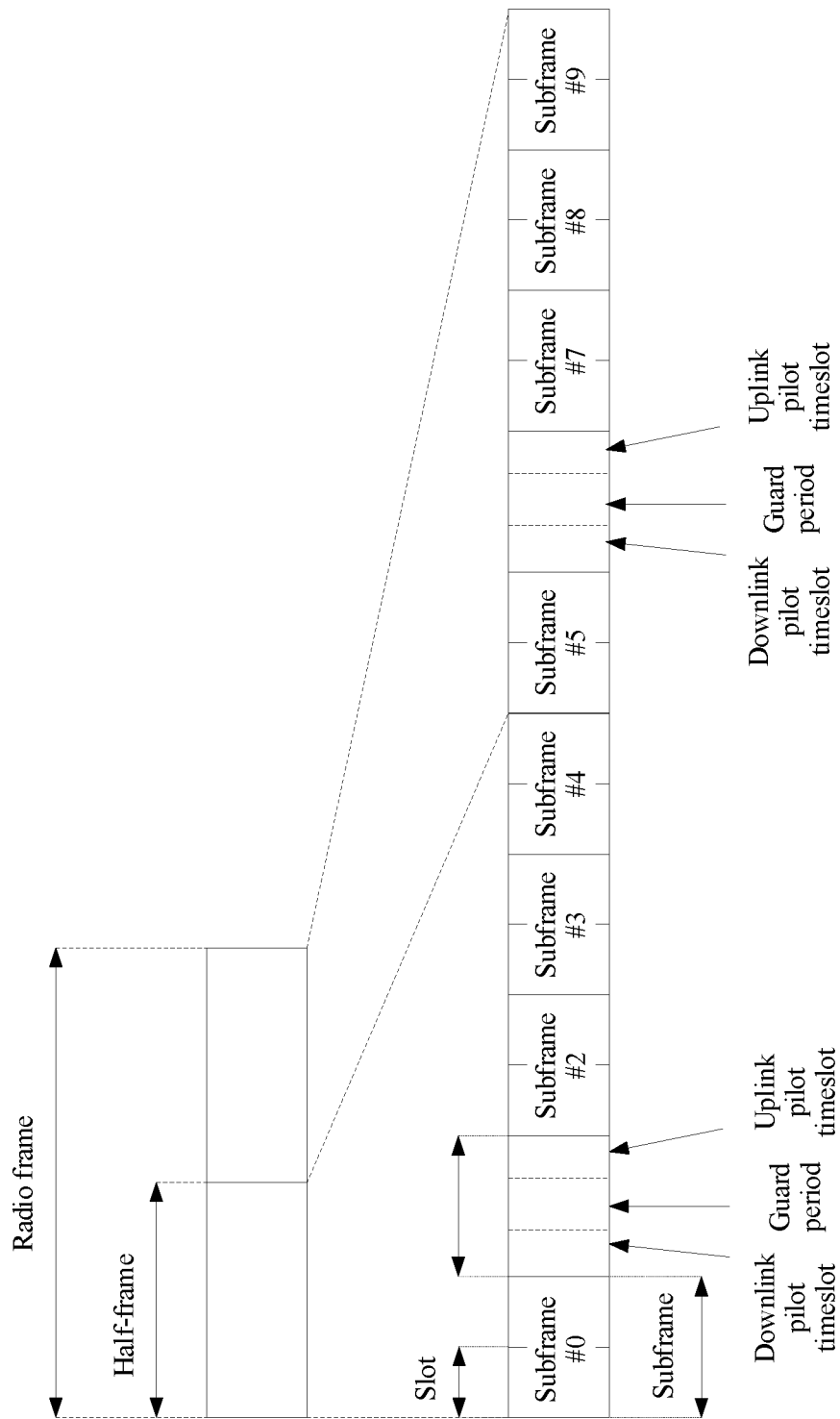
FIG. 2 is a schematic diagram of a frame structure in a TDD system.
Figure 4:
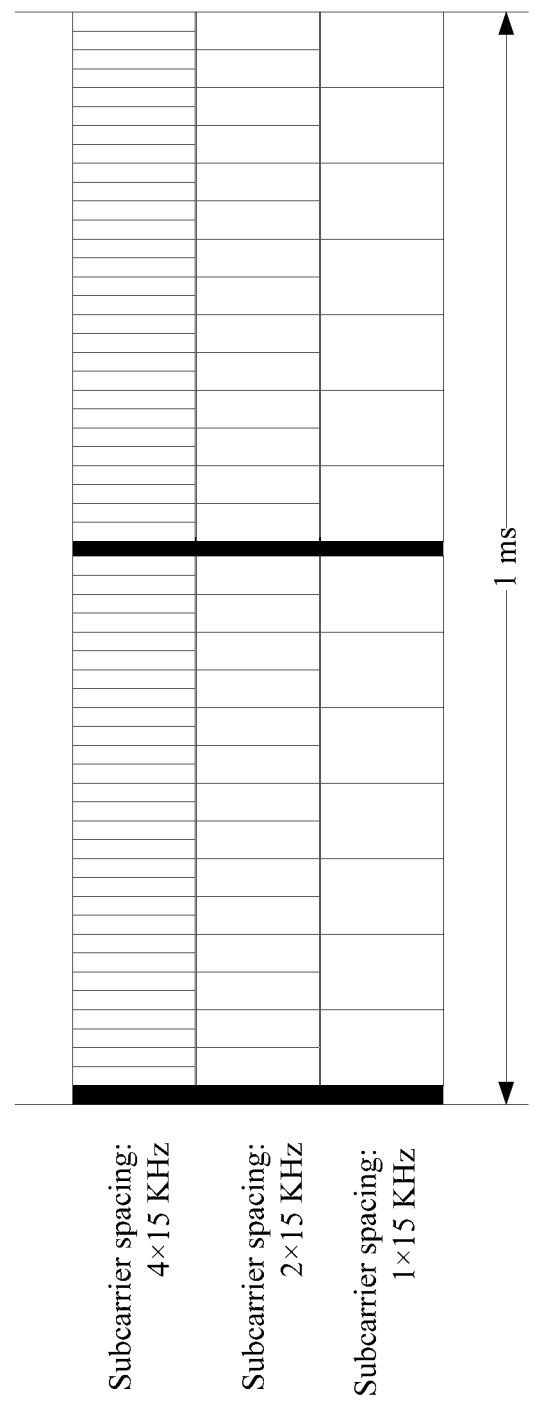
FIG. 4 is a schematic diagram of different subframes, slots, and mini-slots corresponding to different subcarrier spacings in an FDD communications system in an NR communications technology.
Figure 5:
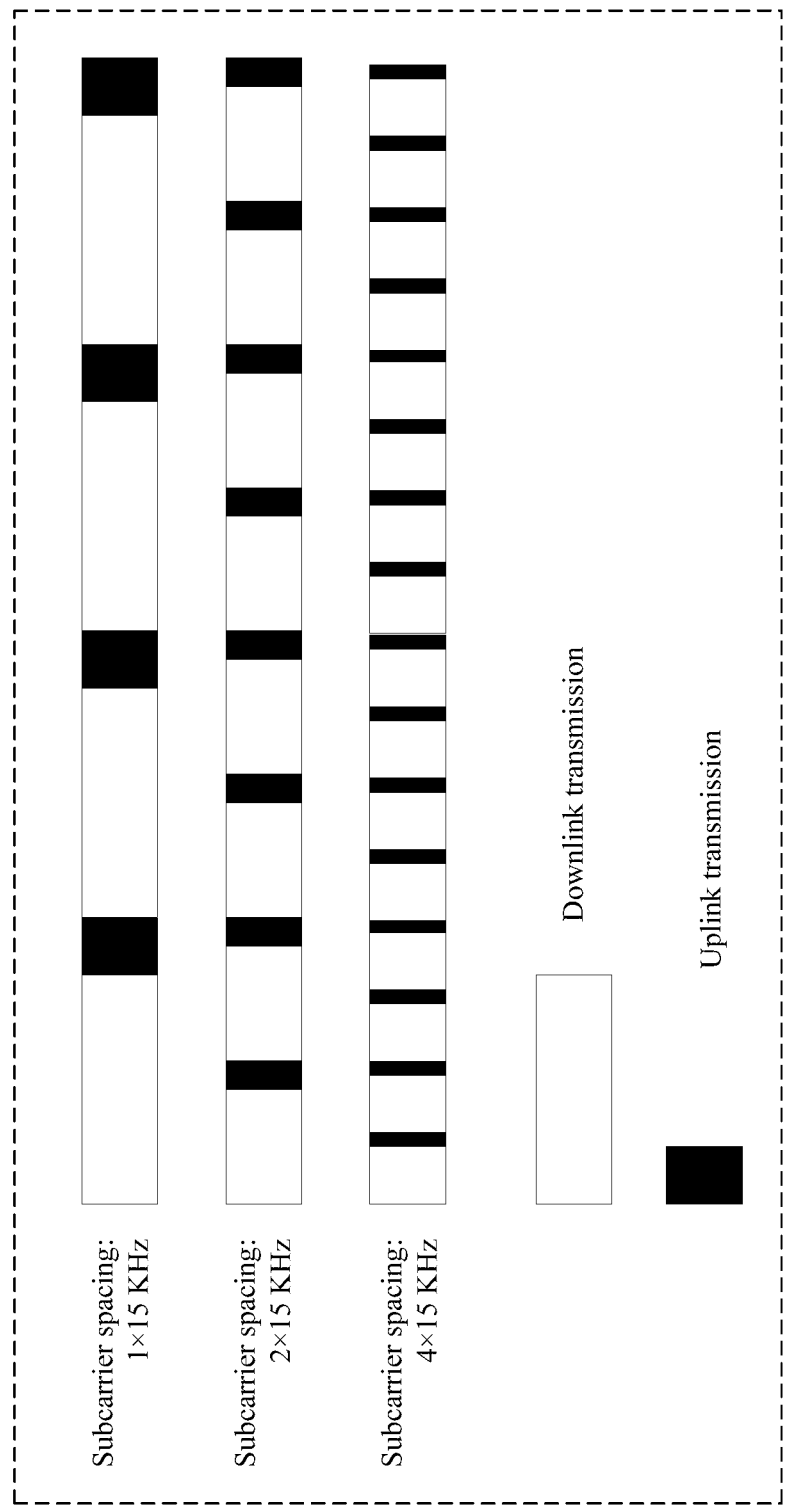
FIG. 5 is a schematic diagram of frame structures corresponding to different subcarrier spacings during uplink transmission and downlink transmission in a TDD communications system in an NR communications technology.
Figure 6:
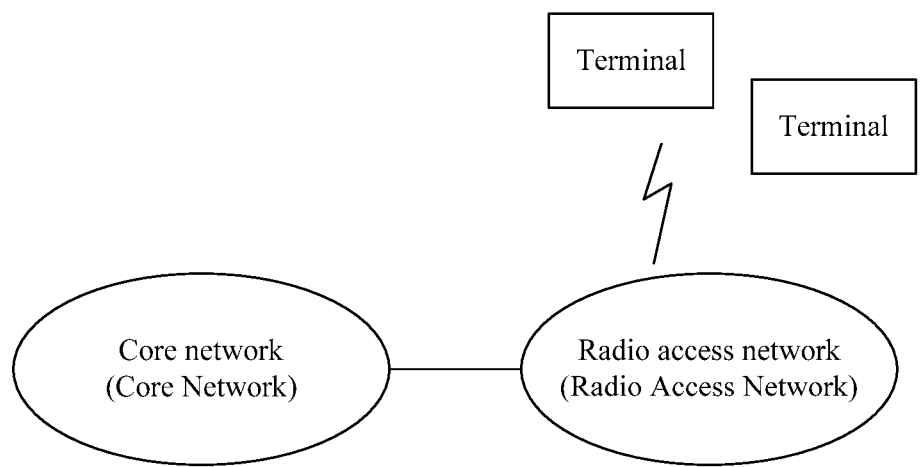
FIG. 6 is a schematic structural diagram of a wireless communications system to which an uplink control information sending method is applied according to an embodiment of this application.

An uplink control information sending method provided in the embodiments of this application may be applied to a wireless communications system shown in FIG. 6. As shown in FIG. 6, a terminal accesses a core network (CN) through a radio access network (RAN), and performs various communications services.

It may be understood that the wireless communications system is a network that provides a wireless communication function. The wireless communications system may use different communications technologies, such as Code Division Multiple Access (CDMA), Wideband Code Division Multiple Access (WCDMA), Time Division Multiple Access (time division multiple access, TDMA), Frequency Division Multiple Access (FDMA), orthogonal frequency division multiple access (OFDMA), single carrier frequency division multiple access (SC-FDMA), and carrier sense multiple access with collision avoidance. Based on factors such as capacities, rates, and delays of different networks, networks may be classified into a 2G network, a 3G network, a 4G network, and a future evolved network such as a 5G network. A typical 2G network includes a Global System for Mobile Communications GSM) network or a general packet radio service (GPRS) network. A typical 3G network includes a Universal Mobile Telecommunications System (UMTS) network. A typical 4G network includes a Long Term Evolution (LTE) network. The UMTS network sometimes may also be referred to as a universal terrestrial radio access network (UTRAN), and the LTE network sometimes may also be referred to as an evolved universal terrestrial radio access network (E-UTRAN). Based on different resource allocation manners, the networks may be classified into a cellular communications network and a wireless local area network (WLAN). The cellular communications network focuses on scheduling, and the WLAN focuses on contention. All the foregoing 2G, 3G, and 4G networks are cellular communications networks. A person skilled in the art should know that, with development of technologies, the technical solutions provided in the embodiments of this application may also be applied to another wireless communications network such as a 4.5G or 5G network, or another non-cellular communications network. For brevity, the wireless communications network sometimes is referred to as a network for short in the embodiments of this application.

The cellular communications network is one of wireless communications networks. The cellular communications network connects terminal equipment and a network device through a radio channel in a cellular wireless networking manner, to implement mutual communication between moving users. The cellular communications network has a main feature of terminal mobility, and has functions of inter-cell handover and automatic roaming across a local network.

The following embodiments of this application are described using a 5G NR communications system as an example. An example in which a network device is an eNB and a terminal is UE is used for description. It should be noted that the solutions in the embodiments of this application may be further applied to another wireless communications network, and a corresponding name may also be replaced with a name of a corresponding function in the another wireless communications network.

In the 5G NR communications system, the UE may be in a plurality of types of architectures of an NR network, for example, a multicarrier architecture, a multi-cell architecture, or an architecture of a high-density cell including a macro eNB/micro eNB and a remote radio unit. In addition, the UE may simultaneously work on frame structures corresponding to a plurality of different subcarrier spacings.

Figure 7:
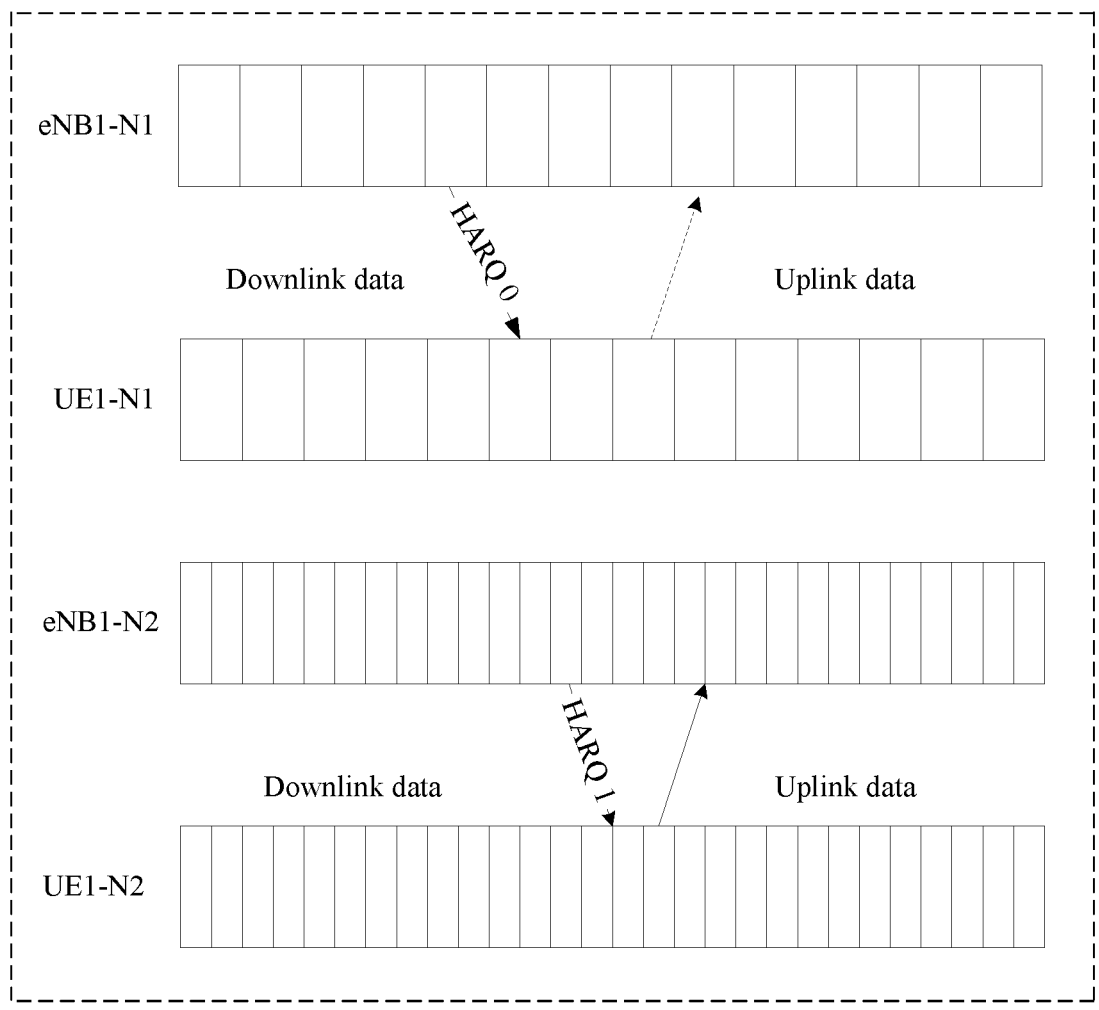
FIG. 7 is a schematic diagram of feeding back downlink data acknowledgement information by a network device and a terminal on frame structures corresponding to two different subcarrier spacings.

FIG. 7 is a schematic diagram of feeding back downlink data acknowledgement information by an eNb 1 and UE 1 on frame structures corresponding to two different subcarrier spacings. In FIGS. 7, N1 and N2 indicate two types of subframes/slots with different lengths and two different subcarrier spacings. The eNb 1 sends hybrid automatic repeat request (Hybrid Automatic Repeat Request, HARQ) transport block information or code block information to the UE 1, and the UE 1 feeds back, to the eNB 1, acknowledgement information such as an ACK or a NACK that is based on a transport block or a code block. Referring to FIG. 7, it can be learned that downlink data is sent on an OFDM symbol corresponding to a subframe/slot with a specific length and a specific subcarrier spacing. For uplink data corresponding to the downlink data, acknowledgement information such as an ACK or a NACK of the downlink data is sent on an OFDM symbol corresponding to a subframe/slot with a same length and a same subcarrier spacing as the downlink data. Consequently, a relatively large amount of uplink information of some frame structures may be fed back. If PUCCH channel resources of the frame structures with a relatively large feedback amount are insufficient, the downlink data acknowledgement information is not fed back in time.

Likewise, the foregoing process of feeding back the downlink data acknowledgement information is also applicable to another uplink control information, for example, scheduling request information, or channel state information including at least one of channel quality indication information, precoding matrix indication information, and a rank indication.

However, UE working in one subframe or a plurality of subframes on one carrier may work in various subcarrier spacings. Therefore, in the embodiments of this application, PUCCH channel resources of different frame structures can be fully used, and uplink control information fed back using a PUCCH channel resource of a frame structure with a relatively large feedback amount is fed back using a PUCCH channel resource of a frame structure with a relatively small feedback amount, so that uplink control information can be quickly fed back using PUCCH channel resources of various frame structures.

The following describes the process of feeding back the downlink data acknowledgement information in the embodiments of this application with reference to actual application.

Figure 8:
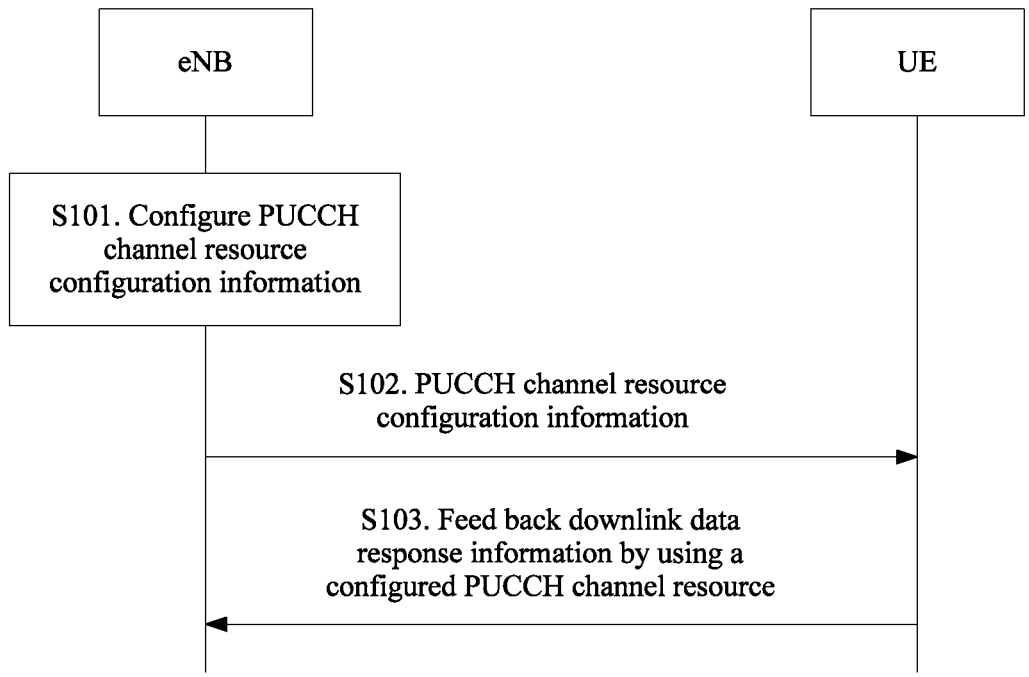
FIG. 8 is a flowchart of an uplink control information sending method according to an embodiment of this application.

FIG. 8 is a flowchart of an uplink control information send method according to an embodiment of this application. Referring to FIG. 8, the method includes the following steps.

S101. An eNB configures and sends PUCCH channel resource configuration information.

In this embodiment of this application, the PUCCH channel resource configuration information is used to instruct UE to feed back downlink data acknowledgement information based on a configured PUCCH channel resource. In this embodiment of this application, the eNB may instruct, through an explicit instruction, an implicit instruction, or a combination of an explicit instruction and an implicit instruction using the PUCCH channel resource configuration information, the UE to send uplink control information based on the configured PUCCH channel resource.

The eNB may send the PUCCH channel resource configuration information using at least one or a combination of broadcast information, system information, a Radio Resource Control (RRC) message, a Media Access Control control element (MAC CE), and physical layer signaling.

Optionally, a set of a plurality of pieces of corresponding PUCCH channel resource configuration information may be sent using one or a combination of the broadcast information, the system message, the RRC dedicated signaling, and the MAC CE, and one of the plurality of pieces of PUCCH channel resource configuration information is activated using the physical layer control information. The activated PUCCH signal resource configuration information may be sent in one or a combination of the following manners: implicitly sending the PUCCH channel resource configuration information using downlink control information (DCI) of a downlink channel or a resource on which the downlink channel is located; or implicitly sending the PUCCH channel resource configuration information using a resource on which a PDCCH is located or DCI that is used to indicate a PDCCH channel resource publicly used by the UE; or implicitly sending the PUCCH channel resource configuration information using a resource on which a PDCCH is located or DCI that is used to indicate a reference channel resource used by the UE; or implicitly sending the PUCCH channel resource configuration information using a resource on which a PDCCH is located or DCI that is used to indicate a specific channel resource used by the terminal. The implicitly sending the PUCCH channel resource configuration information using downlink control information (DCI) of a downlink channel or a resource on which the downlink channel is located includes implicitly sending the PUCCH channel resource configuration information using a resource on which a corresponding downlink channel is located or DCI of the downlink channel used to indicate a PUCCH channel resource that is not configured.

Herein, performing implicit sending using the resource on which the downlink channel is located includes: obtaining the activated PUCCH signal resource configuration information through calculation based on an index of a resource unit on which the DCI of the downlink channel is located. For example, a modulo operation is performed on the index of the resource unit on which the DCI is located using a sum of elements of the set of the plurality of pieces of corresponding PUCCH channel resource configuration information, and an obtained remainder and/or an obtained integer multiple value are/is used to indicate the activated PUCCH signal resource configuration information.

The index of the resource unit on which the DCI is located may be an index of an $N^{th}$ resource unit on which the DCI is located, and N is an integer greater than or equal to 1. The resource unit may include a resource element, a physical layer radio resource block, a resource element group, and a control channel element.

In this embodiment of this application, when the PUCCH channel resource configuration information is sent using the DCI, a bit in the DCI is used to indicate at least one of PUCCH channel frame format information, PUCCH resource index information, PUCCH channel identifier information, and PUCCH resource location information.

DCI bit information may specifically include a meaning in the following Table 1:

TABLE 1

| Content | DCI bit information | Specific content |
|---|---|---|
| PUCCH channel identifier | X bits | A plurality of PUCCH channel IDs are configured at a higher layer, |

TABLE 1-continued

| Content | DCI bit information | Specific content |
|---|---|---|
| information | | and one PUCCH channel ID is selected for DCI. For example, PUCCH ID 0 indicates an uplink carrier whose subcarrier spacing is 15 KHz, or uplink cell frequency domain information. |
| PUCCH-OFDM start location information | 3 bits | For example, 000 corresponds to a first OFDM symbol of a slot; and 001 corresponds to a second OFDM symbol of a slot, where a binary number is used to represent a start location. 010 corresponds to a third OFDM symbol of a slot. |
| Quantity of OFDM symbols occupied by a PUCCH | 1 bit, 2 bits, or 3 bits | One or two OFDM symbols; a maximum of four OFDM symbols; or a maximum of seven OFDM symbols. |
| PUCCH subcarrier spacing information | X bits | The X bits are used to indicate that a subcarrier spacing is 15 KHz, 30 KHz, or the like. |
| PUCCH frequency domain offset value | X bits | A physical resource block is used as a unit, and a frequency domain offset value is agreed on using a binary method. |
| PUCCH slot information | X bits | Value of a current offset between a slot in which a PUCCH configuration is located and a slot in which a PUCCH is located |

The PUCCH frequency domain offset value may be one of PUCCH frequency domain offset values that are configured at a higher layer or that are previously configured. The frequency domain value may be obtained based on a PUCCH resource index value. The PUCCH channel resource configuration information may be sent using the RRC message, and the PUCCH channel resource configuration information includes at least two types of configured PUCCH channel resources. In this case, the eNB may send activation indication information to the UE, and the activation indication information is used to activate one of the at least two types of configured PUCCH channel resources.

In this embodiment of this application, the PUCCH channel resource configuration information includes at least one of frequency band information, carrier information, cell identifier information, cell synchronization information, beam information, frame format information, subcarrier spacing information, a channel resource location, time domain and/or frequency domain location information of an OFDM symbol occupied by a PUCCH, sequence information used by a PUCCH, resource index information used by a PUCCH, sequence cyclic offset information used for the uplink control information, orthogonal sequence information used for the uplink control information, sequence cyclic offset information used for a reference signal, and an orthogonal sequence used for a reference signal. The channel resource location is information about a resource on a carrier or a frequency band. The time domain and/or frequency domain location information of the OFDM symbol occupied by the PUCCH may include one or a combination of radio frame information, slot information in a radio frame, and time domain and/or frequency domain location information of an OFDM symbol in a slot. The time domain and/or frequency domain location information of the OFDM symbol occupied by the PUCCH are/is time domain and/or frequency domain location information of an OFDM symbol occupied by specific UCI in the PUCCH. For example, the location is at least one of a time domain start location, OFDM symbol duration, a time domain start location and PUCCH format information. The uplink control information may include, for example, at least one of HARQ feedback information, scheduling request information, buffer status report information, beam identifier (identification, ID) information, and channel state information (Channel State Information, CSI such as channel state indication information including at least one of channel quality indication information, precoding matrix indication information, a rank indication, a channel state information resource indication, and channel state information interference measurement. The sequence cyclic offset information is information about a sequence and/or cyclic offset information of the sequence. The sequence information used by the PUCCH includes the sequence information used for the uplink control information and/or the sequence information used for the reference signal.

The time domain and/or frequency domain location information of the OFDM symbol occupied by the PUCCH may include start location information of the OFDM symbol occupied by the PUCCH and a quantity of occupied OFDM symbols, or may include information about a start location and an end location of the OFDM symbol occupied by the PUCCH. The time domain and/or frequency domain location information of the OFDM symbol occupied by the PUCCH may include a frequency domain start location occupied by the PUCCH and information about a frequency domain bandwidth occupied by the PUCCH, or may include a frequency domain start location occupied by the PUCCH and a frequency domain end location occupied by the PUCCH.

The scheduling request information may further include at least one of service resource requirement information, delay requirement information, subcarrier spacing requirement information, beam resource requirement information, time domain resource requirement information, code domain resource requirement information, space domain resource requirement information, uplink resource requirement information, downlink resource requirement information, resource requirement information of the uplink control information, and the like. The frame format information herein includes: whether each slot and/or each mini-slot of each subframe works in an FDD manner or in a TDD manner, a direction (uplink or downlink) of a slot, a direction (uplink or downlink) of an OFDM symbol in a slot, and a subcarrier spacing setting in a slot that may include subcarrier spacings occupied by an uplink control channel, an uplink data channel, a downlink control channel, and a downlink data channel in a slot and/or a mini-slot.

In this embodiment of this application, the PUCCH channel resource configuration information includes at least one of the following combinations: a combination of the frequency band information, the carrier information, the cell identifier information, and the cell synchronization information; a combination of the frequency band information, the carrier information, the cell identifier information, the cell synchronization information, and the beam information; a combination of the subcarrier spacing information and the channel resource location; and a combination of the subcarrier spacing information and the time domain and/or frequency domain location information of the OFDM symbol occupied by the PUCCH.

More specifically, the PUCCH channel resource configuration information may include channel resource configuration information used for an uplink ACK or NACK feedback, channel resource configuration information for feeding back a downlink channel CSI-RS, channel resource configuration information for uplink scheduling request information, channel resource configuration information for a buffer status report, and channel resource configuration information in a frame format of a PUCCH.

S102. UE receives the PUCCH channel resource configuration information sent by the eNB.

The PUCCH channel resource configuration information is received using at least one or a combination of the RRC message, the MAC CE, and the physical layer signaling.

For example, the resource configuration information includes at least one of frequency band information, carrier information, cell identifier information, cell synchronization information, beam information, frame format information, subcarrier spacing information, a channel resource location, time domain and/or frequency domain location information of an OFDM symbol occupied by a PUCCH, sequence information used by a PUCCH, resource index information used by a PUCCH, sequence cyclic offset information used for the uplink control information, orthogonal sequence information used for the uplink control information, sequence cyclic offset information used for a reference signal, and an orthogonal sequence used for a reference signal.

The frequency band information, the carrier information, the cell identifier information, the cell synchronization information, the beam information, the frame format information, the subcarrier spacing information, the channel resource location, the sequence information used by the PUCCH, the resource index information used by the PUCCH, the sequence cyclic offset information used for the uplink control information, the orthogonal sequence information used for the uplink control information, the sequence cyclic offset information used for the reference signal, and the orthogonal sequence information used for the reference signal are configured through RRC, and the time domain and/or frequency domain location information of the OFDM symbol occupied by the PUCCH is provided by the physical layer signaling.

If the PUCCH channel resource configuration information is received using the physical layer signaling, the PUCCH channel resource configuration information is implicitly received using the DCI or the resource on which the downlink channel is located, or the PUCCH channel resource configuration information is implicitly received using the resource on which the PDCCH is located or the DCI that is used to indicate the PDCCH channel resource publicly used by the terminal, or the PUCCH channel resource configuration information is implicitly received using the resource on which the PDCCH is located or the DCI that is used to indicate the reference channel resource used by the terminal, or the PUCCH channel resource configuration information is implicitly received using the resource on which the PDCCH is located or the DCI that is used to indicate the specific channel resource used by the terminal.

Alternatively, a plurality of pieces of time domain and/or frequency domain location information of the OFDM symbol occupied by the PUCCH are configured at an RRC layer, and one of the plurality of pieces information is activated by the physical layer signaling. The activation is performed in a plurality of manners using the physical layer signaling: performing activation using the DCI; or performing implicit activation using a time-frequency resource of the physical layer signaling.

The time domain and/or frequency domain location information of the OFDM symbol occupied by the PUCCH may include start location information of the OFDM symbol occupied by the PUCCH and a quantity of occupied OFDM symbols, or may include information about a start location and an end location of the OFDM symbol occupied by the PUCCH. The time domain and/or frequency domain location information of the OFDM symbol occupied by the PUCCH may include a frequency domain start location occupied by the PUCCH and information about a frequency domain bandwidth occupied by the PUCCH, or may include a frequency domain start location occupied by the PUCCH and a frequency domain end location occupied by the PUCCH.

In this embodiment of this application, the PUCCH channel resource configuration information is received using the RRC message, and the PUCCH channel resource configuration information includes at least two types of configured PUCCH channel resources. The UE may receive the activation indication information sent by the eNB, determine the configured PUCCH channel resource according to the activation indication information, and feed back the downlink data acknowledgement information using one of the at least two types of configured PUCCH channel resources.

S103. The UE feeds back downlink data acknowledgement information based on the PUCCH channel resource configuration information using a configured PUCCH channel resource.

In this embodiment of this application, the downlink data acknowledgement information fed back using the configured PUCCH channel resource may be for the UE, for a specific HARQ process of the UE, for a transport block (TB) in a specific HARQ process of the UE, or for one or more code blocks (CB) of a transport block in a specific HARQ process of the UE.

In this embodiment of this application, the downlink data acknowledgement information includes at least one of the following: specified downlink data acknowledgement information fed back using a first PUCCH channel resource; downlink data acknowledgement information, in a specified HARQ process, fed back using a first PUCCH channel resource; and specified downlink data acknowledgement information, in a specified HARQ process, fed back using a first PUCCH channel resource. The downlink data acknowledgement information may be acknowledgement information for one or more transport blocks and/or one or more code blocks in the transport blocks. The downlink data acknowledgement information may be alternatively acknowledgement information of a transport block and/or a code block transmitted on one or more specified beams. Alternatively, the downlink data acknowledgement information may be at least one of the following: specified downlink data acknowledgement information fed back using a first PUCCH channel resource; downlink data acknowledgement information, in a specified HARQ process, fed back using a first PUCCH channel resource; specified downlink data acknowledgement information, in a specified HARQ process, fed back using a first PUCCH channel resource; acknowledgement information, of a specified code block of specified downlink data in a specified HARQ process, fed back using a first PUCCH channel resource; transport block acknowledgement information sent using a PDSCH channel resource; transport block acknowledgement information, in a specified HARQ process, sent using a PDSCH channel resource; specified transport block acknowledgement information, in a specified HARQ process, sent using a PDSCH channel resource; acknowledgement information, of a specified code block of a transport block in a specified HARQ process, sent using a PDSCH channel resource; and acknowledgement information, of a code block of a transport block, sent using a PDSCH channel resource. The downlink data acknowledgement information is acknowledgement information for one or more transport blocks and/or one or more code blocks in the transport blocks. The downlink data acknowledgement information may be alternatively acknowledgement information of a transport block and/or a code block transmitted on one or more specified beams.

In this embodiment of this application, the PUCCH channel resource configuration information may be PUCCH channel resource update information. The UE feeds back the downlink data acknowledgement information using an updated PUCCH channel resource, and the updated PUCCH channel resource is updated based on the PUCCH channel resource update information.

In a possible implementation, the PUCCH channel resource configuration information is used to instruct to update, to a second PUCCH channel resource, a first PUCCH channel resource used to feed back the downlink data acknowledgement information. A subcarrier spacing of the second PUCCH channel resource is different from a subcarrier spacing of the first PUCCH channel resource, or a subcarrier on which the second PUCCH channel resource is located is different from a subcarrier on which the first PUCCH channel resource is located. In this embodiment of this application, alternatively, the subcarrier spacing of the second PUCCH channel resource may be the same as the subcarrier spacing of the first PUCCH channel resource, and the subcarrier on which the second PUCCH channel resource is located may be the same as the subcarrier on which the first PUCCH channel resource is located. For example, the subcarrier spacing of the second PUCCH channel resource is greater than and/or equal to the subcarrier spacing of the first PUCCH channel resource.

If the first PUCCH channel resource used to feed back the downlink data acknowledgement information works in an FDD manner, the second PUCCH channel resource also works in the FDD manner. In addition, the subcarrier spacing of the second PUCCH channel resource is greater than and/or equal to the subcarrier spacing of the first PUCCH channel resource, thereby reduce a feedback delay.

A time of feeding back the downlink data acknowledgement information using the second PUCCH channel resource is earlier than a time of feeding back the downlink data acknowledgement information using the first PUCCH channel resource. If the first PUCCH channel resource used to feed back the downlink data acknowledgement information works in a TDD manner, the second PUCCH channel resource also works in the TDD manner, thereby improving resource utilization. In this case, the subcarrier spacing of the second PUCCH channel resource is greater than and/or equal to the subcarrier spacing of the first PUCCH channel resource, or the subcarrier spacing of the second PUCCH channel resource may be less than the subcarrier spacing of the first PUCCH channel resource.

In this embodiment of this application, the first PUCCH channel resource may include one first PUCCH channel resource, or may include at least two types of first PUCCH channel resources. Downlink data acknowledgement information that is fed back using the one first PUCCH channel resource or the at least two types of first PUCCH channel resources and that can be simultaneously sent is fed back using the second PUCCH channel resource. If the first PUCCH channel resource used to feed back the downlink data acknowledgement information works in the TDD manner, the second PUCCH channel resource also works in the TDD manner, thereby increasing a feedback speed.

In this embodiment of this application, if a conflict occurs when the downlink data acknowledgement information fed back using the at least two types of first PUCCH channel resources is fed back using the second PUCCH channel resource, the UE may select, based on a sequence of priorities of the at least two types of first PUCCH channel resources, downlink data acknowledgement information fed back using at least one of the at least two types of first PUCCH channel resources, to feed back the downlink data acknowledgement information using the second PUCCH channel resource; and discard downlink data acknowledgement information fed back using some first PUCCH channel resources. The sequence of priorities is determined according to at least one of a hybrid automatic repeat request identifier priority that is preset by the eNB, a frame format priority, and a delay requirement urgency degree.

In this embodiment of this application, the UE may feed back, through binding or multiplexing using the second PUCCH channel resource, the downlink data acknowledgement information fed back using the at least two types of first PUCCH channel resources.

In this embodiment of this application, the UE may feed back, on the configured PUCCH channel resource, feedback information of downlink data received on a physical downlink shared channel (PDSCH) channel resource from a plurality of carriers or a plurality of subcarrier spacings. A subcarrier spacing of the PUCCH channel resource is less than and/or equal to a subcarrier spacing of any one of the foregoing PDSCH channel resources, or a subcarrier spacing of the PUCCH channel resource is less than and/or equal to a subcarrier spacing preconfigured for any one of the foregoing PDSCH channel resources.

In this embodiment of this application, the PUCCH channel resource configuration information may be further used to instruct to feed back, on the configured PUCCH channel resource, feedback information of downlink data received on a physical downlink shared channel PDSCH channel resource. A subcarrier spacing of the configured PUCCH channel resource is different from a subcarrier spacing of the PDSCH channel resource, or a subcarrier on which the configured PUCCH channel resource is located is different from a subcarrier on which the PDSCH channel resource is located. In this embodiment of this application, alternatively, the subcarrier spacing of the configured PUCCH channel resource may be the same as the subcarrier spacing of the PDSCH channel resource, and the subcarrier on which the configured PUCCH channel resource is located may be the same as the subcarrier on which the PDSCH channel resource is located. For example, the subcarrier spacing of the configured PUCCH channel resource is greater than and/or equal to the subcarrier spacing of the PDSCH channel resource.

In this embodiment of this application, according to the uplink control information sending method, the downlink data acknowledgement information fed back using the first PUCCH channel resource may be fed back using the second PUCCH channel resource, and the second PUCCH channel resource and the first PUCCH channel resource correspond to different frame structures, subcarrier spacings, and slot duration, so that acknowledgement information for downlink data of PUCCH channel resources of various frame structures can be quickly fed back, thereby improving PUCCH channel resource utilization. The PDSCH channel resource and the PUCCH channel resource may belong to a same slot, or belong to a same mini-slot, or belong to an agreed time domain block and/or frequency domain block.

In this embodiment of this application, after feeding back the downlink data acknowledgement information using the configured PUCCH channel resource (the second PUCCH channel resource), the UE can still perform a rollback to feed back the downlink data acknowledgement information using a PUCCH channel resource that is not configured (the first PUCCH channel resource). For example, the eNB sends indication information to the UE, and the indication information is used to instruct the UE to feed back the downlink data acknowledgement information using the PUCCH channel resource that is not configured. The UE receives the indication information sent by the eNB, and performs a rollback according to the indication information to feed back the downlink data acknowledgement information using the PUCCH channel resource that is not configured.

In this embodiment of this application, the eNB may send the indication information using downlink control information. Certainly, the indication information may be sent using at least one or a combination of broadcast information, a system message, RRC dedicated signaling, a MAC CE, and physical layer control information. Optionally, a combination of a plurality of pieces of indication information is sent using one or a combination of the broadcast information, the system message, the RRC dedicated signaling, and the MAC CE, and one of the plurality of pieces of indication information is activated using the physical layer control information.

In this embodiment of this application, it may be specified that the UE feeds back the uplink control information using the configured PUCCH channel resource (the second PUCCH channel resource), and effective information may be set. The effective information may be an effective time, a timer, or a quantity of times of sending the uplink control information using the configured PUCCH channel resource.

In this embodiment of this application, after feeding back the uplink control information using the configured PUCCH channel resource (the second PUCCH channel resource) meets the effective information, feeding back the uplink control information using the configured PUCCH channel resource (the second PUCCH channel resource) may be stopped, and instead, the uplink control information is sent using another channel resource. For example, a rollback is performed to feed back the uplink control information using the PUCCH channel resource that is not configured (the first PUCCH channel resource).

In this embodiment of this application, when a rollback is performed to feed back the uplink control information using the PUCCH channel resource that is not configured (the first PUCCH channel resource), the effective information for performing a rollback to feed back the uplink control information using the PUCCH channel resource that is not configured (the first PUCCH channel resource) may be set. The effective information may be an effective time, a timer, or a quantity of times of feeding back the downlink data acknowledgement information using the configured PUCCH channel resource. If feeding back the downlink data acknowledgement information using the configured PUCCH channel resource meets the effective information, a rollback may be performed to feed back the downlink data acknowledgement information using the PUCCH channel resource that is not configured. For example, after the configured PUCCH channel resource is used for specified duration, the downlink data acknowledgement information is fed back using the PUCCH channel resource that is not configured.

In this embodiment of this application, the UE feeds back the downlink data acknowledgement information using the configured PUCCH channel resource (the second PUCCH channel resource), and performs a rollback to feed back the downlink data acknowledgement information using the PUCCH channel resource that is not configured (the first PUCCH channel resource). This is applicable to a scenario in which load corresponding to downlink data acknowledgement information fed back using PUCCH channel resources of various frame structures tends to be balanced.

According to the uplink control information sending method provided in this embodiment of this application, the PUCCH channel resource configuration information is used to instruct the terminal to send the uplink control information based on the configured PUCCH channel resource. Therefore, PUCCH channel resources of different frame structures can be fully used, and uplink control information fed back using a PUCCH channel resource of a frame structure with a relatively large feedback amount is fed back using a PUCCH channel resource of a frame structure with a relatively small feedback amount, so that uplink control information can be quickly fed back using PUCCH channel resources of various frame structures.

The foregoing mainly describes the solutions provided in the embodiments of this application from a perspective of interaction between a network device and a terminal. It may be understood that, to implement the foregoing functions, the network device and the terminal include corresponding hardware structures and/or software modules for performing the functions. With reference to the units and algorithm steps described in the embodiments disclosed in this application, the embodiments of this application can be implemented in a form of hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the technical solutions in the embodiments of this application.

In the embodiments of this application, the network device and the terminal may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit. It should be noted that the unit division in the embodiments of this application is an example, and is merely logical function division, and may be other division during actual implementation.

Figure 9:
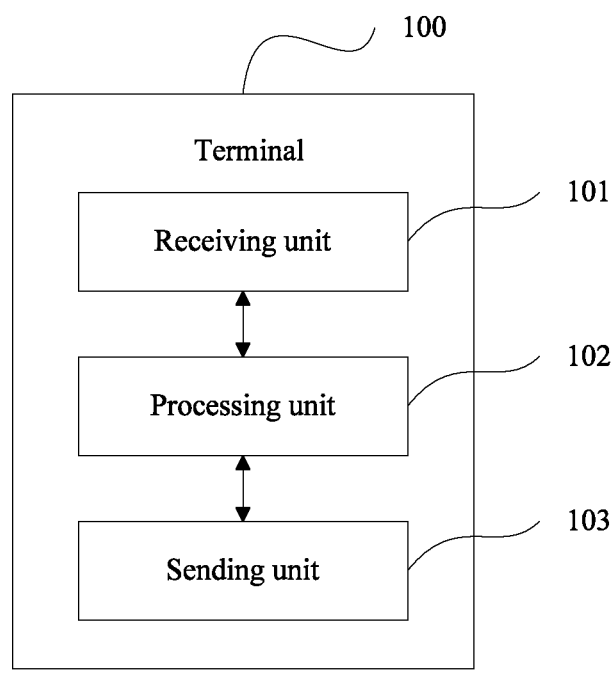
FIG. 9 is a schematic structural diagram of a terminal according to an embodiment of this application.

When an integrated unit is used, FIG. 9 is a schematic structural diagram of a terminal according to an embodiment of this application. As shown in FIG. 9, a terminal 100 includes a receiving unit 101, a processing unit 102, and a sending unit 103.

The processing unit 102 is configured to determine PUCCH channel resource configuration information, where the PUCCH channel resource configuration information is used to instruct the terminal to send uplink control information based on a configured PUCCH channel resource, and the PUCCH channel resource configuration information is preconfigured, or is sent by a network device and received using the receiving unit 101. The sending unit 103 is configured to send, based on the PUCCH channel resource configuration information determined by the processing unit 102, the uplink control information using the configured PUCCH channel resource. The uplink control information includes one or a combination of downlink data acknowledgement information, a downlink channel state information, a scheduling request, and buffer state information.

The downlink data acknowledgement information includes at least one of the following: specified downlink data acknowledgement information fed back using a first PUCCH channel resource; downlink data acknowledgement information, in a specified HARQ process, fed back using a first PUCCH channel resource; specified downlink data acknowledgement information, in a specified HARQ process, fed back using a first PUCCH channel resource; acknowledgement information, of a specified code block of specified downlink data in a specified HARQ process, fed back using a first PUCCH channel resource; transport block acknowledgement information sent using a PDSCH channel resource; transport block acknowledgement information, in a specified HARQ process, sent using a PDSCH channel resource; specified transport block acknowledgement information, in a specified HARQ process, sent using a PDSCH channel resource; acknowledgement information, of a specified code block of a transport block in a specified HARQ process, sent using a PDSCH channel resource; and acknowledgement information, of a code block of a transport block, sent using a PDSCH channel resource.

The PUCCH channel resource configuration information includes at least one of frequency band information, carrier information, cell identifier information, cell synchronization information, beam information, frame format information, subcarrier spacing information, a channel resource location, time domain and/or frequency domain location information of an orthogonal frequency division multiplexing OFDM symbol occupied by a PUCCH, sequence information used by a PUCCH, resource index information used by a PUCCH, sequence cyclic offset information used for the uplink control information, orthogonal sequence information used for the uplink control information, sequence cyclic offset information used for a reference signal, and an orthogonal sequence used for a reference signal.

The PUCCH channel resource configuration information includes at least one of the following combinations: a combination of the frequency band information, the carrier information, the cell identifier information, and the cell synchronization information; a combination of the frequency band information, the carrier information, the cell identifier information, the cell synchronization information, and the beam information; a combination of the subcarrier spacing information and the channel resource location; and a combination of the subcarrier spacing information and the time domain and/or frequency domain location information of the OFDM symbol occupied by the PUCCH.

In a possible design, the PUCCH channel resource configuration information is used to instruct to: update, to a second PUCCH channel resource, a first PUCCH channel resource used to feed back the uplink control information, where a subcarrier spacing of the second PUCCH channel resource is different from a subcarrier spacing of the first PUCCH channel resource, or a subcarrier on which the second PUCCH channel resource is located is different from a subcarrier on which the first PUCCH channel resource is located; or feed back, on the configured PUCCH channel resource, a channel state information and/or feedback information of downlink data that are/is received on a PDSCH channel resource, where a subcarrier spacing of the configured PUCCH channel resource is different from a subcarrier spacing of the PDSCH channel resource, or a subcarrier on which the configured PUCCH channel resource is located is different from a subcarrier on which the PDSCH channel resource is located.

In still another possible design, the subcarrier spacing of the second PUCCH channel resource is greater than and/or equal to the subcarrier spacing of the first PUCCH channel resource; and the subcarrier spacing of the configured PUCCH channel resource is greater than and/or equal to the subcarrier spacing of the PDSCH channel resource.

In still another possible design, the PUCCH channel resource configuration information is used to instruct to update, to the second PUCCH channel resource, the first PUCCH channel resource used to feed back the uplink control information. A time of feeding back the uplink control information using the second PUCCH channel resource is earlier than or equal to a time of feeding back the uplink control information using the first PUCCH channel resource; or a time of feeding back the uplink control information using the second PUCCH channel resource is within a feedback time range agreed on by the terminal.

In still another possible design, the uplink control information includes the downlink data acknowledgement information; and the downlink data acknowledgement information fed back using the configured PUCCH channel resource is downlink data acknowledgement information fed back using at least two types of first PUCCH channel resources or downlink data acknowledgement information fed back using at least two types of PDSCH channel resources.

In still another possible design, the sending unit 103 feeds back the downlink data acknowledgement information in the following manners using the configured PUCCH channel resource: feeding back, using the second PUCCH channel resource, downlink data acknowledgement information fed back using at least one of the at least two types of first PUCCH channel resources; or feeding back, using the configured PUCCH channel resource, downlink data acknowledgement information fed back using at least one of the at least two types of PDSCH channel resources.

The at least one of the at least two types of first PUCCH channel resources is selected based on a sequence of priorities of the at least two types of first PUCCH channel resources. The at least one of the at least two types of PDSCH channel resources is selected based on a sequence of priorities of the at least two types of PDSCH channel resources. The sequence of priorities is determined according to at least one of a hybrid automatic repeat request identifier priority that is preset by the network device, a frame format priority, and a delay requirement urgency degree.

In still another possible design, the sending unit 103 feeds back, through binding or multiplexing using the second PUCCH channel resource, the downlink data acknowledgement information fed back using the at least one of the at least two types of first PUCCH channel resources. The sending unit 103 feeds back, through binding or multiplexing using the configured PUCCH channel resource, the downlink data acknowledgement information fed back using the at least one of the at least two types of PDSCH channel resources.

In still another possible design, the receiving unit 101 is further configured to: after the sending unit 103 feeds back the uplink control information using the configured PUCCH channel resource, receive indication information sent by the network device, where the indication information is used to instruct the terminal to send the uplink control information using a PUCCH channel resource that is not configured. The sending unit 103 is further configured to send the uplink control information according to the indication information using the PUCCH channel resource that is not configured.

The receiving unit 101 receives the indication information using downlink control information.

In still another possible design, the processing unit 102 is further configured to determine effective information of feeding back the uplink control information using the configured PUCCH channel resource.

In still another possible design, the receiving unit 101 receives the PUCCH channel resource configuration information using at least one or a combination of an RRC message, a MAC CE, and physical layer signaling.

If the PUCCH channel resource configuration information is received using the physical layer signaling, the PUCCH channel resource configuration information is implicitly received using downlink control information DCI or a resource on which a downlink channel is located, or the PUCCH channel resource configuration information is implicitly received using a resource on which a PDCCH is located or DCI that is used to indicate a PDCCH channel resource publicly used by the terminal, or the PUCCH channel resource configuration information is implicitly received using a resource on which a PDCCH is located or DCI that is used to indicate a reference channel resource used by the terminal, or the PUCCH channel resource configuration information is implicitly received using a resource on which a PDCCH is located or DCI that is used to indicate a specific channel resource used by the terminal.

A bit in the DCI is used to indicate at least one of PUCCH channel frame format information, PUCCH resource index information, PUCCH channel identifier information, and PUCCH resource location information.

If the PUCCH channel resource configuration information is received using the RRC message, the PUCCH channel resource configuration information includes at least two types of configured PUCCH channel resources. The receiving unit 101 is further configured to: before the sending unit 103 feeds back the uplink control information using the configured PUCCH channel resource, receive activation indication information sent by the network device, where the activation indication information is used to activate one of the at least two types of configured PUCCH channel resources.

In still another possible design, the PUCCH channel resource configuration information is PUCCH channel resource update information. The sending unit 103 feeds back the downlink data acknowledgement information using an updated PUCCH channel resource, and the updated PUCCH channel resource is updated based on the PUCCH channel resource update information.

When a hardware form is used for implementation, the processing unit 102 of the terminal 100 may be a processor, the receiving unit 101 may be a receiver, and the sending unit 103 may be a transmitter.

Figure 10:
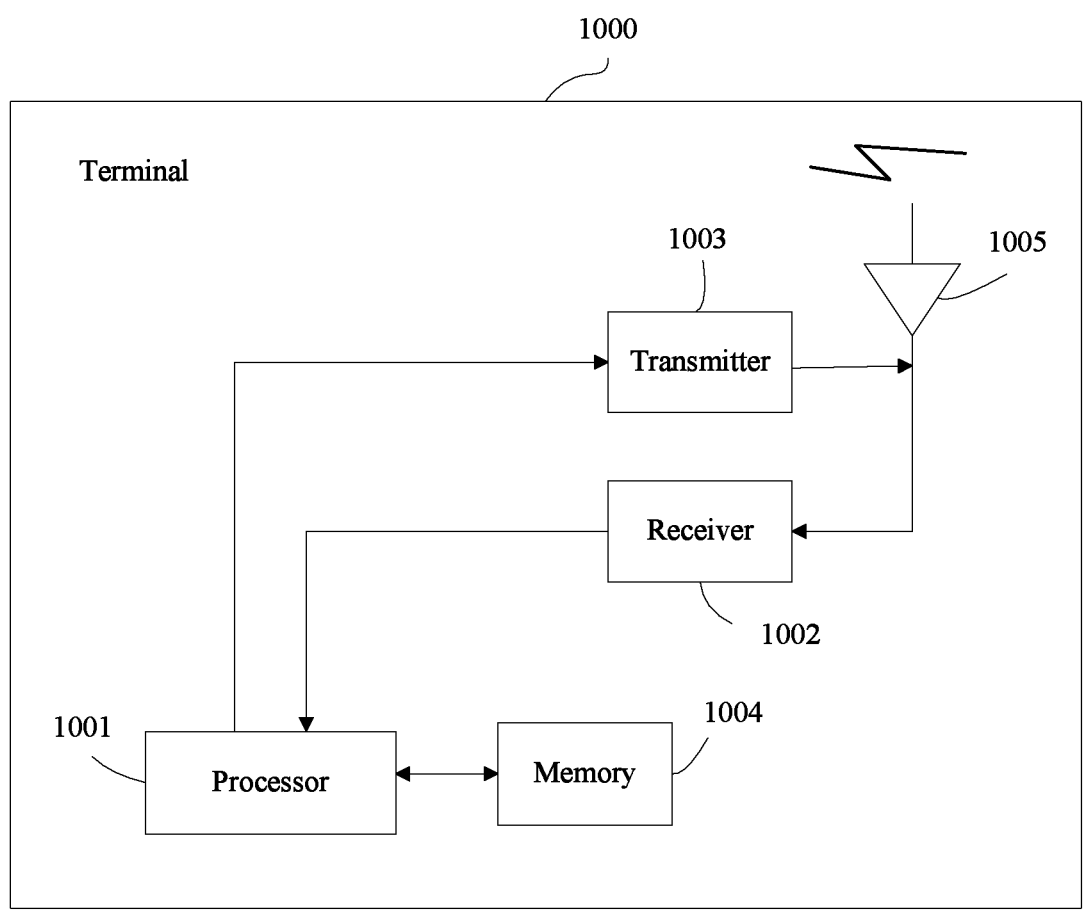
FIG. 10 is a schematic structural diagram of another terminal according to an embodiment of this application.

When the processing unit 102 of the terminal 100 is a processor, the receiving unit 101 is a receiver, and the sending unit 103 is a transmitter, the terminal 100 in this embodiment of this application may be a terminal 1000 shown in FIG. 10.

FIG. 10 shows another possible terminal according to an embodiment of this application. As shown in FIG. 10, a terminal 1000 includes a processor 1001, a receiver 1002, and a transmitter 1003. The terminal 1000 may further include a memory 1004. The memory 1004 is configured to couple to the processor 1001, and the memory 1004 stores a program instruction and data that are necessary for the terminal 1000.

Further, the terminal 1000 may include an antenna 1005.

The receiver 1002 is configured to support the terminal in receiving PUCCH channel resource configuration information sent by a network device. The processor 1001 is configured to support the terminal in performing a function of the terminal in the foregoing uplink control information send method. The transmitter 1003 is configured to support the terminal in sending uplink control information based on the PUCCH channel resource configuration information and a configured PUCCH channel resource.

In the embodiments of this application, for concepts, explanations, detailed descriptions, and other steps that are related to the technical solutions provided in the embodiments of this application and that are related to the terminal 100 and the terminal 1000, refer to descriptions of content in the foregoing method or other embodiments. Details are not described herein again.

Figure 11:
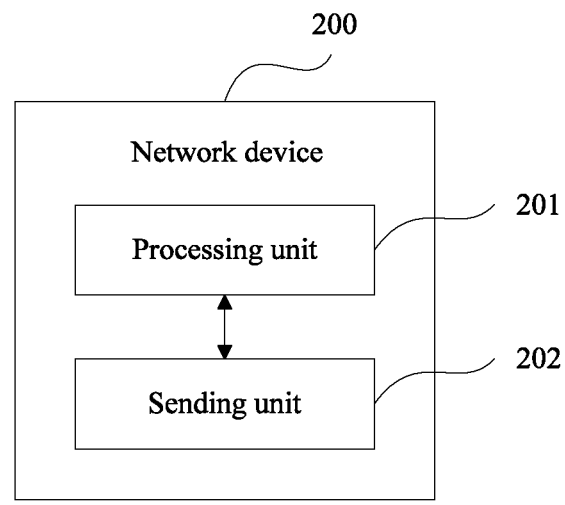
FIG. 11 is a schematic structural diagram of a network device according to an embodiment of this application.

When an integrated unit is used, FIG. 11 is a schematic structural diagram of a network device according to an embodiment of this application. Referring to FIG. 11, a network device 200 includes a processing unit 201 and a sending unit 202. The processing unit 201 is configured to determine PUCCH channel resource configuration information, where the PUCCH channel resource configuration information is used to instruct a terminal to send uplink control information based on a configured PUCCH channel resource. The sending unit 202 is configured to send the PUCCH channel resource configuration information determined by the processing unit 201. The uplink control information includes one or a combination of downlink data acknowledgement information, a downlink channel state information, a scheduling request, and buffer state information.

The downlink data acknowledgement information includes at least one of the following: specified downlink data acknowledgement information fed back using a first PUCCH channel resource; downlink data acknowledgement information, in a specified HARQ process, fed back using a first PUCCH channel resource; specified downlink data acknowledgement information, in a specified HARQ process, fed back using a first PUCCH channel resource; acknowledgement information, of a specified code block of specified downlink data in a specified HARQ process, fed back using a first PUCCH channel resource; transport block acknowledgement information sent using a PDSCH channel resource; transport block acknowledgement information, in a specified HARQ process, sent using a PDSCH channel resource; specified transport block acknowledgement information, in a specified HARQ process, sent using a PDSCH channel resource; acknowledgement information, of a specified code block of a transport block in a specified HARQ process, sent using a PDSCH channel resource; and acknowledgement information, of a code block of a transport block, sent using a PDSCH channel resource.

The PUCCH channel resource configuration information includes at least one of frequency band information, carrier information, cell identifier information, cell synchronization information, beam information, frame format information, subcarrier spacing information, a channel resource location, time domain and/or frequency domain location information of an orthogonal frequency division multiplexing OFDM symbol occupied by a PUCCH, resource index information used by a PUCCH, sequence cyclic offset information used for the uplink control information, orthogonal sequence information used for the uplink control information, sequence cyclic offset information used for a reference signal, and an orthogonal sequence used for a reference signal.

The PUCCH channel resource configuration information includes at least one of the following combinations: a combination of the frequency band information, the carrier information, the cell identifier information, and the cell synchronization information; a combination of the frequency band information, the carrier information, the cell identifier information, the cell synchronization information, and the beam information; a combination of the subcarrier spacing information and the channel resource location; and a combination of the subcarrier spacing information and the time domain and/or frequency domain location information of the OFDM symbol occupied by the PUCCH.

In a possible design, the PUCCH channel resource configuration information is used to instruct to: update, to a second PUCCH channel resource, a first PUCCH channel resource used to feed back the uplink control information, where a subcarrier spacing of the second PUCCH channel resource is different from a subcarrier spacing of the first PUCCH channel resource, or a subcarrier on which the second PUCCH channel resource is located is different from a subcarrier on which the first PUCCH channel resource is located; or feed back, on the configured PUCCH channel resource, a channel state information and/or feedback information of downlink data that are/is received on a PDSCH channel resource, where a subcarrier spacing of the configured PUCCH channel resource is different from a subcarrier spacing of the PDSCH channel resource, or a subcarrier on which the configured PUCCH channel resource is located is different from a subcarrier on which the PDSCH channel resource is located.

In still another possible design, the subcarrier spacing of the second PUCCH channel resource is greater than and/or equal to the subcarrier spacing of the first PUCCH channel resource; and the subcarrier spacing of the configured PUCCH channel resource is greater than and/or equal to the subcarrier spacing of the PDSCH channel resource.

In still another possible design, the PUCCH channel resource configuration information is used to instruct to update, to the second PUCCH channel resource, the first PUCCH channel resource used to feed back the uplink control information. A time of feeding back the uplink control information using the second PUCCH channel resource is earlier than or equal to a time of feeding back the uplink control information using the first PUCCH channel resource; or a time of feeding back the uplink control information using the second PUCCH channel resource is within a feedback time range agreed on by the terminal.

In still another possible design, the uplink control information includes the downlink data acknowledgement information; and the downlink data acknowledgement information fed back using the configured PUCCH channel resource is downlink data acknowledgement information fed back using at least two types of first PUCCH channel resources or downlink data acknowledgement information fed back using at least two types of physical downlink shared channel PDSCH channel resources.

In still another possible design, downlink data acknowledgement information fed back using the second PUCCH channel resource is downlink data acknowledgement information fed back using at least one of the at least two types of first PUCCH channel resources; or the downlink data acknowledgement information fed back using the configured PUCCH channel resource is downlink data acknowledgement information fed back using at least one of the at least two types of PDSCH channel resources.

In still another possible design, the at least one of the at least two types of first PUCCH channel resources is selected based on a sequence of priorities of the at least two types of first PUCCH channel resources. The at least one of the at least two types of PDSCH channel resources is selected based on a sequence of priorities of the at least two types of PDSCH channel resources. The sequence of priorities is determined according to at least one of a hybrid automatic repeat request identifier priority that is preset by the network device, a frame format priority, and a delay requirement urgency degree.

The PUCCH channel resource configuration information is used to instruct the terminal to feed back, through binding or multiplexing using the second PUCCH channel resource, the downlink data acknowledgement information fed back using the at least one of the at least two types of first PUCCH channel resources. Alternatively, the PUCCH channel resource configuration information is used to instruct the terminal to feed back, through binding or multiplexing using the configured PUCCH channel resource, the downlink data acknowledgement information fed back using the at least one of the at least two types of PDSCH channel resources.

In still another possible design, the sending unit 202 is further configured to send indication information after sending the PUCCH channel resource configuration information, where the indication information is used to instruct the terminal to send the uplink control information using a PUCCH channel resource that is not configured.

The indication information is sent using downlink control information.

In still another possible design, the sending unit 202 is further configured to send effective information of feeding back the uplink control information by the terminal using the configured PUCCH channel resource.

In still another possible design, the sending unit 202 sends the PUCCH channel resource configuration information using at least one or a combination of an RRC message, a Media Access Control control element MAC CE, and physical layer signaling.

If the PUCCH channel resource configuration information is sent using the physical layer signaling, the PUCCH channel resource configuration information is implicitly sent using a resource on which a corresponding downlink channel is located or downlink control information DCI of the downlink channel used to indicate a PUCCH channel resource that is not configured, or the PUCCH channel resource configuration information is implicitly sent using a resource on which a PDCCH is located or DCI that is used to indicate a PDCCH channel resource publicly used by the terminal, or the PUCCH channel resource configuration information is implicitly sent using a resource on which a PDCCH is located or DCI that is used to indicate a reference channel resource used by the terminal, or the PUCCH channel resource configuration information is implicitly sent using a resource on which a PDCCH is located or DCI that is used to indicate a specific channel resource used by the terminal.

A bit in the DCI is used to indicate at least one of PUCCH channel frame format information, PUCCH resource index information, PUCCH channel identifier information, and PUCCH resource location information.

If the PUCCH channel resource configuration information is sent using the RRC message, and the PUCCH channel resource configuration information includes at least two types of configured PUCCH channel resources, the sending unit 202 is further configured to send activation indication information after sending the PUCCH channel resource configuration information, where the activation indication information is used to activate one of the at least two types of configured PUCCH channel resources.

In still another possible design, the PUCCH channel resource configuration information is PUCCH channel resource update information. The PUCCH channel resource configuration information is used to instruct the terminal to feed back the downlink data acknowledgement information using an updated PUCCH channel resource, and the updated PUCCH channel resource is updated based on the PUCCH channel resource update information.

When a hardware form is used for implementation, the processing unit 201 of the network device 200 may be a processor or a controller. The sending unit 202 of the network device 200 may be a communications interface, a transceiver, a transceiver circuit, or the like. The communications interface is a generic term, and may include one or more interfaces.

Figure 12:
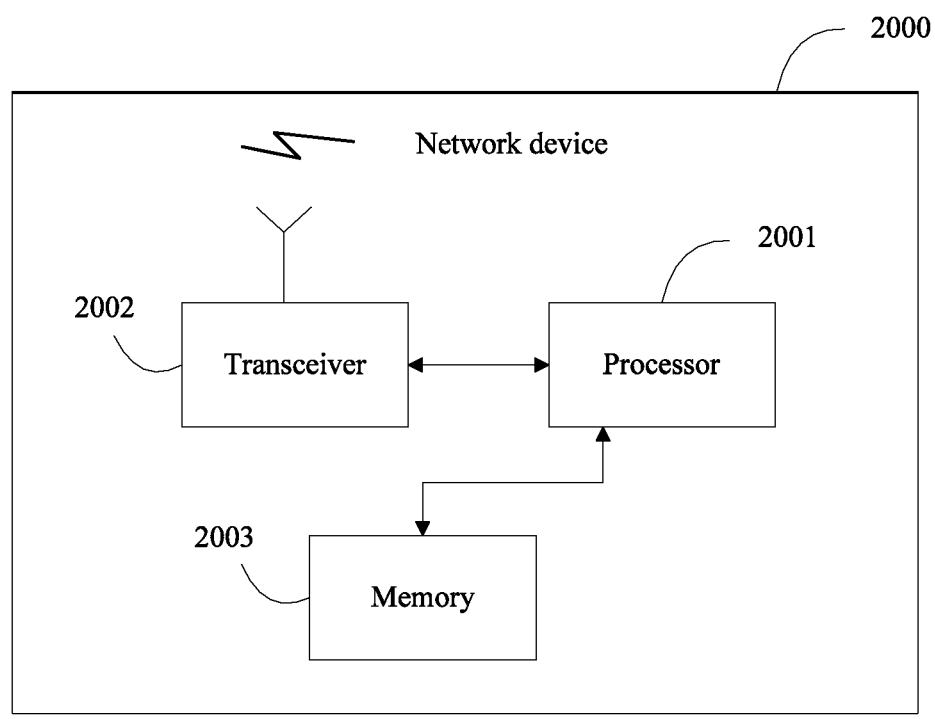
FIG. 12 is a schematic structural diagram of another network device according to an embodiment of this application.

When the processing unit 201 included in the network device 200 is a processor, and the sending unit 202 is a transceiver, the network device 200 provided in this embodiment of this application may have a structure shown in FIG. 12.

FIG. 12 is a schematic structural diagram of another possible network device according to an embodiment of this application. As shown in FIG. 12, a network device 2000 includes a processor 2001 and a transceiver 2002. The processor 2001 is configured to support the network device 2000 in performing a corresponding function in the foregoing method. The transceiver 2002 is configured to support communication between the network device 2000 and a terminal or another network entity, for example, configured to send PUCCH channel resource configuration information. The network device 2000 may further include a memory 2003. The memory 2003 is configured to couple to the processor 2001, and the memory 2003 stores a program instruction and data that are necessary for the network device 2000.

The network device 2000 may be a base station device.

In the embodiments of this application, for concepts, explanations, detailed descriptions, and other steps that are related to the technical solutions provided in the embodiments of this application and that are related to the network device 200 and the network device 2000, refer to descriptions of content in the foregoing method or other embodiments. Details are not described herein again.

It may be understood that the accompanying drawings of the embodiments of this application show only simplified designs of the network device and the terminal. In actual application, the network device and the terminal are not limited to the foregoing structure. For example, the terminal may further include a display device and an input/output interface, and all terminals that can implement the embodiments of this application are within the protection scope of the embodiments of this application. The network device may further include any quantity of transmitters, receivers, processors, controllers, memories, communications units, or the like, and all network devices that can implement the embodiments of this application are within the protection scope of the embodiments of this application.

It should be noted that the foregoing related processor in the embodiments of this application may be a central processing unit (CPU), a general purpose processor, a digital signal processor (DSP), an application-specific integrated circuit (ASIC), a field programmable gate array (FPGA) or another programmable logic device, a transistor logic device, a hardware component, or a combination thereof. The processor may implement or execute various example logic blocks, modules, and circuits described with reference to content disclosed in this application. Alternatively, the processor may be a combination of processors implementing a computing function, for example, a combination of one or more microprocessors, or a combination of a DSP and a microprocessor.

The memory may be integrated into the processor, or may be separated from the processor.

In an implementation, functions of the receiver and the transmitter may be considered to be implemented using a transceiver circuit or a dedicated transceiver chip. The processor may be considered to be implemented using a dedicated processing chip, processing circuit, or processor, or a universal chip.

In another implementation, program code that is used to implement functions of the processor, the receiver, and the transmitter is stored in the memory. A general purpose processor implements the functions of the processor, the receiver, and the transmitter by executing the code in the memory.

According to the method provided in the embodiments of this application, an embodiment of this application further provides a communications system, including the foregoing network device and one or more terminals.

An embodiment of this application further provides a computer storage medium, configured to store some instructions. When the instructions are executed, any method related to the foregoing terminal or network device may be completed.

A person of ordinary skill in the art may understand that all or some of the steps of the foregoing embodiment method may be implemented by a program instructing the processor. The foregoing program may be stored in a computer readable storage medium. The storage medium may be a non-transitory medium, such as a random access memory, a read-only memory, a flash memory, a hard disk, a solid state drive, a magnetic tape, a floppy disk, an optical disc, or any combination thereof.

The embodiments of this application are described with reference to flowcharts and block diagrams of the method and the device in the embodiments of this application. It should be understood that computer program instructions may be used to implement each process and each block in the flowcharts and the block diagrams and a combination of a process and a block in the flowcharts and the block diagrams. These computer program instructions may be provided for a general purpose computer, a dedicated computer, an embedded processor, or a processor of any other programmable data processing device to generate a machine, so that the instructions executed by a computer or a processor of another programmable data processing device generate an apparatus for implementing a specific function in one or more processes in the flowcharts or in one or more blocks in the block diagrams.

The foregoing descriptions are merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A terminal, comprising a receiver, at least one processor, and a transmitter, wherein:
   the receiver is configured to receive physical uplink control channel (PUCCH) channel resource configuration information, wherein the PUCCH channel resource configuration information indicates a plurality of PUCCH channel resources;
   the at least one processor is configured to determine a first PUCCH channel resource; and
   the transmitter is configured to send uplink control information using the first PUCCH channel resource, wherein the uplink control information comprises at least one of downlink data acknowledgement information, a downlink channel state information, a scheduling request, or buffer state information,
   wherein the PUCCH channel resource configuration information indicates to update, to a second PUCCH channel resource, from the first PUCCH channel resource used to feed back the uplink control information, and wherein a time of feeding back the uplink control information using the second PUCCH channel resource is within a feedback time range.

2. The terminal according to claim 1,
   wherein a subcarrier spacing of the second PUCCH channel resource is different from a subcarrier spacing of the first PUCCH channel resource, or wherein a subcarrier on which the second PUCCH channel resource is located is different from a subcarrier on which the first PUCCH channel resource is located.

3. The terminal according to claim 1, wherein the uplink control information comprises the downlink data acknowledgement information, and wherein the downlink data acknowledgement information comprises acknowledgement information, of one or more code blocks of a transport block, sent on a physical downlink shared channel PDSCH channel resource.

4. The terminal according to claim 3, wherein
   the receiver is further configured to receive, from a network, code blocks information.

5. The terminal according to claim 1, wherein the PUCCH channel resource configuration information comprises at least one of frequency band information, carrier information, cell identifier information, cell synchronization information, beam information, frame format information, subcarrier spacing information, a channel resource location, at least one of time domain or frequency domain location information of an orthogonal frequency division multiplexing (OFDM) symbol occupied by a PUCCH, sequence information used by a PUCCH, resource index information used by a PUCCH, sequence cyclic offset information used for the uplink control information, orthogonal sequence information used for the uplink control information, sequence cyclic offset information used for a reference signal, or an orthogonal sequence used for a reference signal.

6. An uplink control information sending method, the method comprising:
   receiving, by a terminal, physical uplink control channel (PUCCH) channel resource configuration information, wherein the PUCCH channel resource configuration information indicates a plurality of PUCCH channel resources;
   determining, by the terminal, a first PUCCH channel resource based on the PUCCH channel resource configuration information; and
   sending, by the terminal, the uplink control information using the first PUCCH channel resource, wherein the uplink control information comprises at least one of downlink data acknowledgement information, a downlink channel state information, a scheduling request, or buffer state information, wherein the PUCCH channel resource configuration information indicates to update, to a second PUCCH channel resource, from the first PUCCH channel resource used to feed back the uplink control information, and wherein a time of feeding back the uplink control information using the second PUCCH channel resource is within a feedback time range.

7. The method according to claim 6, wherein a subcarrier spacing of the second PUCCH channel resource is different from a subcarrier spacing of the first PUCCH channel resource, or wherein a subcarrier on which the second PUCCH channel resource is located is different from a subcarrier on which the first PUCCH channel resource is located.

8. The method according to claim 6, wherein the uplink control information comprises the downlink data acknowledgement information, and wherein the downlink data acknowledgement information comprises acknowledgement information, of one or more code blocks of a transport block, sent using a physical downlink shared channel (PDSCH) channel resource.

9. The method according to claim 8, wherein the method further comprises:
receiving, by the terminal, code blocks information from a network.

10. The method according to claim 6, wherein the PUCCH channel resource configuration information comprises at least one of frequency band information, carrier information, cell identifier information, cell synchronization information, beam information, frame format information, subcarrier spacing information, a channel resource location, at least one of time domain or frequency domain location information of an orthogonal frequency division multiplexing (OFDM) symbol occupied by a PUCCH, sequence information used by a PUCCH, resource index information used by a PUCCH, sequence cyclic offset information used for the uplink control information, orthogonal sequence information used for the uplink control information, sequence cyclic offset information used for a reference signal, or an orthogonal sequence used for a reference signal.

11. An uplink control information receiving method, the method comprising:
determining, by a network device, physical uplink control channel (PUCCH) channel resource configuration information, wherein the PUCCH channel resource configuration information indicates a plurality of PUCCH channel resource;
sending, by the network device, the PUCCH channel resource configuration information to a terminal; and
receiving, by the network device and from the terminal, uplink control information on a first PUCCH channel resource based on the PUCCH channel resource configuration information;
wherein the uplink control information comprises at least one of downlink data acknowledgement information, a downlink channel state information, a scheduling request, or buffer state information, wherein the PUCCH channel resource configuration information further indicates to update, to a second PUCCH channel resource, from the first PUCCH channel resource used to feed back the uplink control information, and wherein a time of feeding back the uplink control information using the second PUCCH channel resource is within a feedback time range.

12. The method according to claim 11,
wherein a subcarrier spacing of the second PUCCH channel resource is different from a subcarrier spacing of the first PUCCH channel resource, or wherein a subcarrier on which the second PUCCH channel resource is located is different from a subcarrier on which the first PUCCH channel resource is located.

13. The method according to claim 11, wherein the uplink control information comprises the downlink data acknowledgement information, and wherein the downlink data acknowledgement information comprises acknowledgement information, of one or more code blocks of a transport block, sent using a physical downlink shared channel (PDSCH) channel resource.

14. The method according to claim 13, wherein the method further comprises:
sending, by the network device, code blocks information to the terminal.

15. The terminal according to claim 3, wherein the PUCCH channel resource configuration information comprises at least one of frequency band information, carrier information, cell identifier information, cell synchronization information, beam information, frame format information, subcarrier spacing information, a channel resource location, at least one of time domain or frequency domain location information of an orthogonal frequency division multiplexing (OFDM) symbol occupied by a PUCCH, sequence information used by a PUCCH, resource index information used by a PUCCH, sequence cyclic offset information used for the uplink control information, orthogonal sequence information used for the uplink control information, sequence cyclic offset information used for a reference signal, or an orthogonal sequence used for a reference signal.

16. The method according to claim 8, wherein the PUCCH channel resource configuration information comprises at least one of frequency band information, carrier information, cell identifier information, cell synchronization information, beam information, frame format information, subcarrier spacing information, a channel resource location, at least one of time domain or frequency domain location information of an orthogonal frequency division multiplexing (OFDM) symbol occupied by a PUCCH, sequence information used by a PUCCH, resource index information used by a PUCCH, sequence cyclic offset information used for the uplink control information, orthogonal sequence information used for the uplink control information, sequence cyclic offset information used for a reference signal, or an orthogonal sequence used for a reference signal.

17. The method according to claim 11, wherein the PUCCH channel resource configuration information comprises at least one of frequency band information, carrier information, cell identifier information, cell synchronization information, beam information, frame format information, subcarrier spacing information, a channel resource location, at least one of time domain or frequency domain location information of an orthogonal frequency division multiplexing (OFDM) symbol occupied by a PUCCH, sequence information used by a PUCCH, resource index information used by a PUCCH, sequence cyclic offset information used for the uplink control information, orthogonal sequence information used for the uplink control information, sequence cyclic offset information used for a reference signal, or an orthogonal sequence used for a reference signal.

18. The method according to claim 13, wherein the PUCCH channel resource configuration information comprises at least one of frequency band information, carrier information, cell identifier information, cell synchronization information, beam information, frame format information, subcarrier spacing information, a channel resource location, at least one of time domain or frequency domain location information of an orthogonal frequency division multiplexing (OFDM) symbol occupied by a PUCCH, sequence information used by a PUCCH, resource index information used by a PUCCH, sequence cyclic offset information used for the uplink control information, orthogonal sequence information used for the uplink control information, sequence cyclic offset information used for a reference signal, or an orthogonal sequence used for a reference signal.

\* \* \* \* \*